United States Patent
Agesen et al.

(10) Patent No.: US 7,281,102 B1
(45) Date of Patent: *Oct. 9, 2007

(54) RESTRICTING MEMORY ACCESS TO PROTECT DATA WHEN SHARING A COMMON ADDRESS SPACE

(75) Inventors: Ole Agesen, Palo Alto, CA (US); Jeffrey W. Sheldon, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/917,713

(22) Filed: Aug. 12, 2004

(51) Int. Cl.
*G06F 12/00* (2006.01)
(52) U.S. Cl. ............................ 711/163; 711/6; 711/150; 711/151; 711/158
(58) Field of Classification Search ................ None
See application file for complete search history.

(56) References Cited

U.S. PATENT DOCUMENTS 6,671,786 B2 * 12/2003 Wang et al. ............... 711/162
6,775,754 B2 * 8/2004 Okaue et al. .............. 711/163

* cited by examiner

*Primary Examiner*—Reginald Bragdon
*Assistant Examiner*—Mehdi Namazi
(74) *Attorney, Agent, or Firm*—Darryl A. Smith

(57) ABSTRACT

A first software entity occupies a portion of a linear address space of a second software entity and prevents the second software entity from accessing the memory of the first software entity. For example, in one embodiment of the invention, the first software entity is a virtual machine monitor (VMM), which supports a virtual machine (VM), the second software entity. The VMM sometimes directly executes guest instructions from the VM and, at other times, the VMM executes binary translated instructions derived from guest instructions. When executing binary translated instructions, the VMM uses memory segmentation to protect its memory. When directly executing guest instructions, the VMM may use either memory segmentation or a memory paging mechanism to protect its memory. When the memory paging mechanism is active during direct execution, the protection from the memory segmentation mechanism may be selectively deactivated to improve the efficiency of the virtual computer system.

31 Claims, 16 Drawing Sheets

RESTRICTING MEMORY ACCESS TO PROTECT DATA WHEN SHARING A COMMON ADDRESS SPACE

BACKGROUND OF THE INVENTION

1. Field of the Invention

This invention relates to a first software entity transparently using an address space of a second software entity, while preventing the second software entity from accessing memory of the first software entity.

2. Description of the Related Art

In this patent, a particular embodiment of the invention is described in terms of a virtual computer system in which virtualization software runs on a physical computer system and supports a virtual computer, or virtual machine. Guest software, such as a guest operating system (OS) and guest applications, may be loaded onto the virtual computer for execution. The virtualization software occupies a portion of a linear address space of the guest software. This embodiment of the invention relates to protecting the virtualization software from the guest software. In particular, this embodiment of the invention may be implemented as an improvement to existing virtualization products of the assignee of this patent, VMware, Inc. of Palo Alto, Calif. Consequently, this description begins with an introduction to virtual computing and the virtualization products of VMware.

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O (input/output), memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user or application.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the guest software itself. The products of VMware provide all of these advantages in that they allow multiple, isolated VMs, which may (but need not) have OSs different from each other's, to run on a common hardware platform.

Example of a Virtualized System

FIG. 1 illustrates the main components of a system that supports a virtual machine as generally implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit (MMU) 108. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system (OS) 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer. The concept, design and operation of virtual machines are well known in the field of computer science.

The VM's system software 312 may include a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM. Software running in the VM 300, including the guest OS 320 and the guest applications 360, is generally referred to as "guest software."

Note that although the virtual hardware "layer" 301 will be a software abstraction of physical components, the VM's system software 312 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

Some interface is usually required between the VM 300 and the underlying "host" hardware 100, which is responsible for actually executing VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. FIG. 1 shows a VMM 400 running directly on the system hardware 100. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

FIG. 1 illustrates a single VM 300 merely for the sake of simplicity; in many installations, there will be more than one VM installed to run on the common hardware platform; all may have essentially the same general structure, although the individual components need not be identical. Also in FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In all of these configurations, there must be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. A third disadvantage is that the use of a hardware device by a VMM driver may confuse the host OS, which typically would expect that only the host's driver would access the hardware device. In such systems, a better method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, a vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 200.

In some cases, however, it may be beneficial to deploy VMMs on top of a thin software layer, a "kernel," constructed specifically for this purpose. FIG. 2 illustrates an implementation in which a kernel 700 takes the place of and performs the conventional functions of the host OS, including handling actual I/O operations. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, a specially constructed kernel 700 as described above, or whatever other system-level software handles actual I/O operations, takes interrupts, etc. for the VM. The invention may be used in all the different configurations described above.

Memory Mapping in a Virtual Computer System

Most modern computers implement a "virtual memory" mechanism, which allows user-level software to specify memory locations using a set of virtual addresses, which are then translated or mapped into a different set of physical addresses that are actually applied to physical memory to access the desired memory locations. The range of possible virtual addresses that may be used by user-level software constitute a virtual address space, while the range of possible physical addresses that may be specified constitute a physical address space. The virtual address space is typically divided into a number of virtual memory pages, each having a different virtual page number, while the physical address space is typically divided into a number of physical memory pages, each having a different physical page number. A memory "page" in either the virtual address space or the physical address space typically comprises a particular number of memory locations, such as either a four kilobyte (KB) memory page or a four megabyte (MB) memory page in an x86 computer system.

System-level software generally specifies mappings from memory pages in the virtual address space using virtual page numbers to memory pages in the physical address space using physical page numbers. The terms "virtual address" and "virtual address space" relate to the well-known concept of a virtual memory system, which should not be confused with the computer virtualization technology described elsewhere in this patent, involving other well-known concepts such as VMMs and VMs. A well-known technique of memory paging may be used to enable an application to use a virtual address space that is larger than the amount of physical memory that is available for use by the application. The code and data corresponding to some of the pages in the virtual address space may reside in physical memory, while other pages of code and data may be stored on a disk drive, for example. If the application attempts to access a memory location in the virtual address space for which the corresponding data is stored on the disk drive, instead of in physical memory, then the system software typically loads a page worth of data from the disk drive including the desired data into a page of physical memory (possibly first storing the contents of the memory page to disk). The system software then allows the attempted memory access to complete, accessing the physical memory page into which the data has just been loaded.

Now suppose that the host OS 220 of FIG. 1 implements a virtual memory system, with memory paging. This discussion ignores the topic of memory segmentation for now, as this topic is covered in the next section of this patent. Now if a guest application 260 requests access to the hardware memory 104, for example, the request is issued with a virtual address, which must be mapped to a physical address that is issued to the actual hardware memory. This mapping, or translation, is typically specified by the OS 220, which includes some form of memory management module 245 for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When accessing a given memory location specified by a virtual address, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of a hardware memory management unit (MMU) 108. The TLB contains, among other information, VA-to-PA mapping entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. The OS thus specifies the mapping, but the hardware MMU 108 usually actually performs the conversion of one type of page number to the other. Below, for the sake of simplicity, when it is stated that a software module "maps" page numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 320 translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 320 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system, and the host OS need not maintain a GVPN→GPPN mapping.

These address mappings are illustrated in FIG. 3. The guest OS 320 generates a guest OS page table 313 that maps the guest software virtual address space to what the guest OS perceives to be the physical address space. In other words, the guest OS 320 maps GVPNs to GPPNs. Suppose, for example, that a guest application 360 attempts to access a memory location having a first GVPN, and that the guest OS has specified in the guest OS page table that the first GVPN is backed by what it believes to be a physical memory page having a first GPPN. The mapping from the first GVPN to the first GPPN is used by the virtual system hardware 301, and it is loaded into a virtual TLB (VTLB) 330.

The address mapping module 445 within the VMM 400 keeps track of mappings between the GPPNs of the guest OS 320 and the "real" physical memory pages of the physical memory 104 (see FIG. 1) within the system hardware 100. Thus, the address mapping module 445 maps GPPNs from the guest OS 320 to corresponding PPNs in the physical memory. Continuing the above example, the address mapping module translates the first GPPN into a corresponding PPN, let's say a first PPN.

The address mapping module 445 creates a shadow page table 413 that is used by the MMU 108 (see FIG. 1) within the system hardware 100. The shadow page table 413 includes a number of shadow PTEs that generally correspond to the PTEs in the guest OS page table 313, but the shadow PTEs map guest software virtual addresses to corresponding physical addresses in the actual physical memory 104, instead of to the physical addresses specified by the guest OS 320. In other words, while the guest OS page table 313 provides mappings from GVPNs to GPPNs, the shadow PTEs in the shadow page table 413 provide mappings from GVPNs to corresponding PPNs. Thus, continuing the above example, instead of containing a mapping from the first GVPN to the first GPPN, the shadow page table 413 may contain a shadow PTE that maps the first GVPN to the first PPN. Thus, when the guest application attempts to access a memory location having the first GVPN, the MMU 108 uses the mapping from the first GVPN to the first PPN in the shadow page table to access the corresponding memory location in the physical memory page having the first PPN. The MMU also loads the mapping from the first GVPN to the first PPN into a physical TLB 130 in the system hardware 100, if the mapping is not already in the TLB.

Segmented Memory

The best-selling virtualization products of VMware are designed for execution on a processor having the x86 architecture. Some of these VMware products based on the x86 architecture are used as specific examples for describing implementations of this invention. As a result, much of this description uses terminology and conventions of the x86 architecture. In particular, the privilege levels used in the x86 architecture are used throughout this description as a specific example of all such protection mechanisms. Thus, a privilege level of zero is used to indicate a most-privileged level, a privilege level of three is used to indicate a least-privileged level, with privilege levels of one and two indicating intermediate privilege levels, accordingly. Also, a privilege level of three is considered a user privilege level, while a privilege level of zero, one or two is considered a supervisor privilege level. The use of a single protection mechanism having a specific set of privilege levels as an example provides a simpler, more consistent description of the invention. However, the invention is not limited to implementations using the x86 architecture or implementations using similar protection mechanisms. The x86 architecture is described in numerous books and other references, including the IA-32 Intel Architecture Software Developer's Manual (the "IA-32 Manual") from Intel Corporation. One aspect of the x86 architecture that is relevant to this invention is its implementation of memory segmentation. The invention also applies to other architectures that implement segmented memory, however.

The segmented memory implementation of the x86 architecture is illustrated in FIG. 4. As described in detail in the IA-32 Manual, a Global Descriptor Table Register (GDTR) 900 specifies a base address and a limit for a Global Descriptor Table (GDT) 908. The GDT begins in memory at the base address specified in the GDTR, which is illustrated in FIG. 4 by a line marked with a "B" (for base) extending between the GDTR 900 and the GDT 908. The GDT extends in memory to an address that is equal to the sum of the base address specified in the GDTR and the limit that is also specified in the GDTR. The upper limit of the GDT is illustrated in FIG. 4 by a line marked with a "B+L" (for base+limit) also extending between the GDTR 900 and the GDT 908. Corresponding lines, in FIG. 4 and in other drawings in this patent, show the extent of other data structures in memory, as defined by other base addresses and other limits, although these other lines are not marked with the labels "B" and "B+L," respectively, in the other drawings for simplicity.

The GDT contains a number of segment descriptors, such as a first data descriptor 910, a second data descriptor 912 and a code descriptor 914. Each of the segment descriptors specifies a base address, a limit, protection characteristics and other attributes for a memory segment within a four gigabyte (GB) linear address space 916. Thus, for example, the first data descriptor 910 defines a stack segment 918 by specifying a first base address and a first limit, the second data descriptor 912 defines a data segment 920 by specifying a second base address and a second limit, and the code descriptor 914 defines a code segment 922 by specifying a third base address and a third limit.

The base addresses and the limits specified by the segment descriptors define the corresponding memory ranges included in the corresponding memory segments in the same manner as the base address and the limit specified by the GDTR 900 define the range of memory locations occupied by the GDT 908. The beginning address of the stack segment 918 is illustrated in FIG. 4 by a line marked with a "B" extending between the first data descriptor 910 and the stack segment 918, while the ending address of the stack segment is illustrated by a line marked with a "B+L" extending between the first data descriptor and the stack segment. Similarly, the beginning address of the data segment 920 is illustrated in FIG. 4 by a line marked with a "B" extending between the second data descriptor 912 and the data segment 920, while the ending address of the data segment is illustrated by a line marked with a "B+L" extending between the second data descriptor and the data segment. Also, the beginning address of the code segment 922 is illustrated in FIG. 4 by a line marked with a "B" extending between the code descriptor 914 and the code segment 922, while the ending address of the code segment is illustrated by a line marked with a "B+L" extending between the code descriptor and the code segment. Corresponding lines are used in other drawings in this patent to illustrate beginning and ending addresses for other memory segments, although the lines in the other drawings are not marked with the labels "B" and "B+L," respectively, for simplicity.

The x86 architecture also includes a Local Descriptor Table Register (LDTR) that specifies a base address and a limit for a Local Descriptor Table (LDT). The LDTR and LDT are similar to the GDTR and the GDT and are described in detail in the IA-32 Manual. The description in this patent is restricted to using the GDTR and the GDT for simplicity, although it applies equally well to the use of the LDTR and the LDT.

The x86 architecture includes six segment registers that provide contemporaneous access to up to six memory segments. FIG. 4 shows a Stack Segment (SS) register 902, a Data Segment (DS) register 904 and a Code Segment (CS) register 906. The x86 architecture also includes ES, FS and GS data segment registers, which are not shown in FIG. 4 for simplicity. A segment selector is loaded into a segment register to provide access to a memory segment. The segment selector includes an index value, a table indicator and a Requested Privilege Level (RPL). The table indicator indicates whether the index value is applied to the GDT or to the LDT, and the index value selects a segment descriptor from the indicated descriptor table. For this description, the table indicator is assumed to indicate the GDT.

Each segment register includes a software-visible part that contains a segment selector and a hidden part that contains a segment descriptor. When a segment selector is loaded into the visible part of a segment register, the processor also loads the hidden part of the segment register with the base address, segment limit and access control information from the segment descriptor pointed to by the segment selector. After a segment register is loaded with a segment selector, the segment register contains all the information necessary to reference the selected memory segment.

To access a memory location within a memory segment, a segment register is first loaded with a segment selector, which points to a segment descriptor in a descriptor table, the segment descriptor defining the memory segment. Then, for the actual memory reference, the segment register is selected either implicitly or explicitly, and an offset into the memory segment is specified. The segment selector combined with the offset into the memory segment is referred to as a logical address in the IA-32 Manual. The sum of the base address of the memory segment and the offset into the memory segment gives a linear address in the linear address space 916. If memory paging is disabled, the linear address is also used as a physical address in a physical address space 926. Thus, with paging disabled, the linear address is applied directly to the memory 104 to perform a memory access.

If memory paging is enabled, then the linear address is mapped to a corresponding physical address in the physical address space 926 using a set of one or more page tables 924. The process of mapping a linear address to a physical address using the page tables 924 is substantially the same as described above, in the previous section of this patent, with the linear address being treated as a "virtual address" for purposes of that description. Thus, the page tables 924 contain PTEs that provide mappings from linear addresses to corresponding physical addresses, or, more specifically, from linear page numbers (LPNs) to corresponding physical page numbers (PPNs). The resulting physical address in the physical address space 926 is then applied to the memory 104 to perform the memory access.

The "linear address" terminology used in this description of segmented memory may be applied to the previous description of memory paging in a virtual computer system. Thus, referring again to FIG. 3, the guest OS 320 generates a guest OS page table 313 that maps the guest software linear address space 916 (FIG. 4) to what the guest OS perceives to be the physical address space. In other words, the guest OS 320 maps guest linear page numbers (GLPNs) to GPPNs. These mappings from GLPNs to GPPNs are also selectively loaded into the virtual TLB 330. The address mapping module 445 maps GPPNs from the guest OS 320 to corresponding PPNs in the physical memory. The address mapping module 445 creates a shadow page table 413 that is used by the MMU 108 (see FIG. 1) within the system hardware 100. The shadow page table 413 includes a number of shadow PTEs that generally correspond to the PTEs in the guest OS page table 313, but the shadow PTEs map guest software linear addresses to corresponding physical addresses in the actual physical memory 104, instead of to the physical addresses specified by the guest OS 320. In other words, while the guest OS page table 313 provides mappings from GLPNs to GPPNs, the shadow PTEs in the shadow page table 413 provide mappings from GLPNs to corresponding PPNs. These mappings from GLPNs to PPNs are also selectively loaded into the physical TLB 130 in the system hardware 100.

Performance of a Virtual Computer System

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization System Including a Virtual Machine Monitor for a Computer with a Segmented Architecture", "the '242 patent"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

Accordingly, FIG. 1 shows a Direct Execution (DE) unit 460 and a Binary Translation (BT) unit 462. In the best-selling virtualization products of VMware, guest software that operates at user-level in the VM 300 (code that executes at a Current Privilege Level (CPL) of 3 in the x86 architecture) is generally executed directly on the system hardware 100 using the DE unit 460, while guest software that operates at a more-privileged level in the VM (privileged code executing at a CPL of 0, 1 or 2) is generally handled by the BT unit 462. However, as described below, in some circumstances, some guest software that executes at user-level in the VM 300 is handled by the BT unit 462, instead of the DE unit 460.

As described generally in the '242 patent, the direct execution of guest instructions involves setting up certain safeguards, such as memory traces and shadow descriptor tables, and then allowing guest instructions to execute directly on the system hardware 100. Under various circumstances, such as when the guest software issues a system call or when a memory trace is triggered, direct execution of guest instructions is suspended and control passes to the VMM 400. The VMM may emulate the execution of one or more guest instructions, such as through interpretation. Then, depending on the circumstances, the VMM may resume the direct execution of guest instructions, or it may switch over to binary translation, using the BT unit 462.

For binary translation, the BT unit 462 creates and maintains a translation cache within the memory of the VMM 400 that contains code translations for different sets of one or more guest instructions. When binary translation is to be used for a specific set of one or more guest instructions, the BT unit 462 first checks the translation cache for a translation that corresponds to the specific set of one or more guest instructions. If a corresponding translation cannot be found in the cache, then the BT unit 462 generates one. In either case, a corresponding code translation is ultimately executed by the BT unit. After executing one translation, the BT unit may jump to another translation, it may find another translation that corresponds to the next guest instruction(s) to be executed or it may generate a new translation corresponding to the next guest instructions. In this manner, the BT unit 462 may execute multiple translations during a single pass of binary translation.

At some point, however, the VMM 400 will stop executing translated instructions and return to the direct execution of guest instructions, using the DE unit 460, such as when the guest software in the VM 300 returns to the user-level. Thus, the VMM 400 switches back and forth between using the DE unit 460 to directly execute guest instructions and using the BT unit 462 to execute translations of guest instructions. Direct execution is generally used whenever possible for improved performance, but binary translation is used when necessary.

Another technique that is used in existing VMware products to improve performance is to have the VMM 400 share the linear address space of the guest software, including the guest OS 320 and one or more guest applications 360. The VMM 400 continuously shares the linear address space of whichever software is currently executing in the VM 300. During binary translation, memory accesses are made to the memory of both the guest software and the VMM 400. When generating translations, for example, the BT unit 462 accesses guest memory to read the instructions that are to be translated, and it accesses VMM memory to store the translations in the translation cache. More importantly, when executing instructions from the translation cache, accesses are typically also made to data in the guest memory, in addition to data and the instructions from the VMM memory. If the VMM 400 were to maintain a separate address space from the guest software, a change in address spaces would be required each time the VMM 400 switched between accessing guest data and VMM data. As is well known, switching address spaces generally takes a considerable amount of time with the x86 architecture, as well as with other architectures. As a result, the continual switching of address spaces that would be required in binary translation if the VMM were to use a separate address space would dramatically slow down the operation of binary translation.

In addition, the emulation of guest instructions by the VMM 400, such as through interpretation, generally also requires access to the memory of both the VMM and the guest software. Accordingly, if separate address spaces were maintained, transitions from the direct execution of guest instructions to the emulation of guest instructions by the VMM would also be substantially slowed.

As described above, however, the VMM 400 is preferably transparent to the VM software, including the guest software. So the VMM preferably shares the address space of the guest software, without the knowledge of the guest software, and yet the VMM memory must be protected from the guest software. In the virtualization products of VMware described above, the memory segmentation mechanism is used to protect the VMM memory from guest software.

Protection of VMM using Memory Segments

The protection mechanism used in the VMware products described above is illustrated in FIG. 5A. As described above, the virtual system hardware 301 is a virtualization of a complete computer system. In particular, the virtual system hardware includes a VCPU 302, which is a virtualization of a complete, physical processor. In these VMware products, the VCPU 302 also has the x86 architecture. Thus, the VCPU 302 includes a virtual GDTR (V-GDTR) 900V, a virtual CS register (V-CS) 906V and a virtual DS register (V-DS) 904V, as illustrated in FIG. 5A. These virtual registers function in substantially the same manner as the respective physical registers described above, namely the GDTR 900, the CS register 906 and the DS register 904, which are also illustrated in FIG. 5A.

The guest OS 320 creates a Global Descriptor Table in a conventional manner, which is referred to as a guest Global Descriptor Table (G-GDT) 908G. The guest OS 320 then fills the guest GDT 908G with segment descriptors in a conventional manner, such as a guest code descriptor 914G and a guest data descriptor 912G. As described above, each of the segment descriptors defines a memory segment by specifying a base address and a limit for the memory segment, along with other segment properties. Thus, for example, the guest code descriptor 914G defines a guest code segment 922G within a guest linear address space 916V and the guest data descriptor 912G defines a guest data segment 920G in the same address space 916V. The beginning and ending addresses of the guest code segment and the guest data segment, defined by the respective base addresses and limits, are indicated in FIG. 5A using dashed lines extending between the respective descriptors and memory segments. Thus, the guest code segment 922G is made up of a first code segment portion 922V and a second code segment portion 922W, while the guest data segment 920G is made up of a first data segment portion 920V, a second data segment portion 920W and a third data segment portion 920X.

The guest OS 320 also activates the guest GDT 908G within the VM 300 by loading the virtual GDTR 900V with a base address and a limit that correspond to the guest GDT 908G, as illustrated in FIG. 5A by the two lines extending between the virtual GDTR and the guest GDT. The guest OS 320 may also load segment selectors into the segment registers of the VM 300 to activate the corresponding memory segments. For example, as illustrated in FIG. 5A, the guest OS 320 may load a segment selector for the guest code descriptor 914G into the virtual CS 906V to select the guest code segment 922G for instruction fetches, and the guest OS 320 may load a segment selector for the guest data descriptor 912G into the virtual DS 904V to select the guest data segment 920G for data accesses. Of course, the guest OS 320 may also load additional segment descriptors into the guest GDT 908G to define additional memory segments and select additional memory segments for use by loading appropriate segment selectors into the other segment registers.

As described in the '242 patent, however, the system hardware 100 does not access memory segments based on the guest GDT 908G. Instead, the VMM 400 creates a separate, shadow Global Descriptor Table (S-GDT) 908S, as illustrated in FIG. 5A, and loads the hardware GDTR 900 with a base address and limit that correspond to the shadow GDT 908S. Thus, the system hardware 100 accesses memory segments based on the shadow GDT 908S, instead.

As also described in the '242 patent, the VMM 400 loads the shadow GDT 908S with "cached descriptors," "VMM descriptors" and "shadow descriptors." The cached descriptors correspond with the segment descriptors that are loaded into the segment registers of the VM 300 to emulate the segment-caching properties of the x86 architecture. The VMM descriptors are for use by the VMM 400 to access its own memory.

The shadow descriptors, on the other hand, are derived from the guest segment descriptors in the guest GDT 908G. Thus, for example, the shadow GDT 908S may contain a shadow code descriptor 914T that is derived from the guest code descriptor 914G and a shadow data descriptor 912T that is derived from the guest data descriptor 912G. The VMM 400 also puts a memory write trace on the guest GDT 908G, so that the VMM 400 can intercept any guest instruction that attempts to modify a guest segment descriptor in the guest GDT. The VMM 400 can then modify both the guest segment descriptor in the guest GDT and a corresponding shadow descriptor in the shadow GDT in accordance with the guest instruction.

The VMM 400 may also load the physical segment registers with segment selectors to select corresponding memory segments for use. The guest software may also load segment selectors into the physical segment registers, with certain limitations, as described in greater detail below, which will select corresponding memory segments as defined by segment descriptors in the shadow GDT 908S. For example, the CS register 906 may be loaded with a segment selector for the shadow code descriptor 914T, and the DS register 904 may be loaded with a segment selector for the shadow data descriptor 912T, as illustrated in FIG. 5A.

As described in the '242 patent, each of the guest segment descriptors in the guest GDT 908G is generally copied into a corresponding shadow segment descriptor in the shadow GDT 908S, but with a few possible modifications. For example, in generating shadow descriptors from corresponding guest descriptors, the VMM 400 may change the Descriptor Privilege Level (DPL) of some of the descriptors. In particular, if a guest descriptor has a DPL of 0, the VMM of the described embodiment sets the DPL of the corresponding shadow descriptor to 1, so that the shadow descriptor may be loaded into a segment register when binary translation is run at a CPL of 1. The VMM 400 may also disable callgates. Another possible modification involves truncating the memory segment defined by the guest OS 320 to protect the VMM memory.

FIG. 5A shows a VMM memory 930 occupying the upper-most portion of the linear address space 916V of the guest software. In the virtualization products of VMware described above, the VMM memory occupies the top four MB of the four GB linear address space of the guest software. As defined by the guest OS 320 in the guest code descriptor 914G, the guest code segment 922G extends from the bottom of the first code segment portion 922V to the top of the second code segment portion 922W, while the guest data segment 920G extends from the bottom of the first data segment portion 920V, through the second data segment portion 920W, to the top of the third data segment portion 920X. Thus, both the second code segment portion 922W and the second data segment portion 920W coincide with the VMM memory 930 in the linear address space 916V.

If the guest software were allowed to access the linear address space corresponding to the second code segment portion 922W and the second data segment portion 920W, the VMM memory 930 could become corrupted. The VMM 400 cannot allow this to happen. In deriving the shadow code descriptor 914T from the guest code descriptor 914G, the VMM 400 copies most of the data from the guest code descriptor, including the base address for the memory segment 922G, into the shadow code descriptor. However, instead of simply copying the limit from the guest code descriptor 914G, the VMM 400 sets the limit in the shadow code descriptor 914T to a value that indicates the top of the first code segment portion 922V, as illustrated in FIG. 5A. Thus, while the guest code segment 922G includes the two code segment portions 922V and 922W, the code segment defined by the shadow code descriptor 914T, which is actually used by the system hardware 100, includes only the first code segment portion 922V. Similarly, the VMM 400 copies the base address and other data from the guest data descriptor 912G into the shadow data descriptor 912T, but sets the limit in the shadow data descriptor to a value that indicates the top of the first data segment portion 920V, as also illustrated in FIG. 5A. Thus, the VMM 400 truncates the guest code segment 922G at the top of the first code segment portion 922V to create a truncated code segment 922T and it truncates the guest data segment 920G at the top of the first data segment portion 920V to create a truncated data segment 920T. If a guest memory segment does not extend into the region of the linear address space 916V that is occupied by the VMM memory 930, however, then the memory segment need not be truncated when generating a corresponding shadow segment descriptor.

The VMM 400 sets the Descriptor Privilege Level (DPL) of all cached descriptors and all VMM descriptors to a privileged level, such as a DPL of 1 in the x86 architecture. As described above, direct execution is used only for user-level code, which cannot load a segment descriptor that has a DPL of 0, 1 or 2. Thus, during direct execution, guest software cannot load any cached descriptors or VMM descriptors. The only segment descriptors that can be loaded during direct execution are shadow descriptors that have a DPL of 3.

All shadow descriptors are truncated, if necessary, to protect the VMM memory 930. Therefore, during direct execution, the guest software cannot load a segment descriptor that includes any of the linear address space that is occupied by the VMM memory 930. Also, any segment registers that contain VMM descriptors are loaded with appropriate shadow descriptors before the VMM transfers control to direct execution, so that guest software has no access to any VMM descriptors during direct execution. Thus, the user-level guest software may be safely executed directly on the system hardware, and it may be allowed to load segment descriptors from the shadow GDT 908S, without putting the VMM memory 930 at risk.

Referring again to FIG. 5A, suppose that the guest software is being directly executed on the system hardware 100 and the guest software attempts to use the DS register 904 to access a memory location within the second data segment portion 920W. In this case, because the memory location is not within the truncated data segment 920T defined by the shadow descriptor 912T, a general protection fault occurs, which transfers control to the VMM 400. The VMM 400 then emulates the guest instruction that attempted to access the second data segment portion 920W, accessing the appropriate guest memory location, instead of allowing access to a location within the VMM memory 930. After emulating the guest instruction, the VMM 400 may resume the direct execution of guest instructions. As long as the VMM 400 emulates the instructions correctly, the guest software will not be able to determine that it does not have direct access to the entire linear address space 916V.

As described above, during binary translation the BT unit 462 accesses both VMM memory and guest memory. In particular, some instructions in the translations in the translation cache will access VMM memory, while other instructions in the translations attempt to access guest memory. Memory accesses that are intended for VMM memory will be referred to as VMM accesses, while attempted memory accesses that are intended for guest memory are referred to as guest accesses. Although the instructions in the translations in the translation cache are generated by the BT unit 462, the specification of addresses for guest accesses is dependent on guest data. The BT unit 462 does not pre-screen the addresses that are generated for these guest accesses. Therefore, when executing instructions from the translation cache, guest accesses may be directed to the region of the linear address space 916V that is occupied by the VMM memory 930. For example, an instruction from the translation cache may cause an attempted memory access to a memory location within the second data segment portion 920W. Again, the VMM 400 must not allow such guest accesses to reach the VMM memory. At the same time, however, VMM accesses must be allowed to reach the VMM memory.

In earlier VMware products based on the x86 architecture, the BT unit 462 always executes as privileged code, at a CPL of 1. For now, for simplicity, this description assumes that the BT unit 462 executes only at a CPL of 1. As described below, however, in more recent VMware products the BT unit 462 sometimes also executes at a CPL of 3. When the BT unit 462 executes at a CPL of 1, the BT unit can generally load a segment register with a shadow descriptor, which allows the BT unit to access guest memory, or with a VMM descriptor, which allows the BT unit to access VMM memory. In the VMware products described above, the BT unit loads some of the segment registers with VMM descriptors to provide access to the VMM memory 930, and it loads one or more other segment registers with shadow descriptors to provide contemporaneous access to the guest memory. The BT unit (and more generally the VMM 400) uses cached descriptors to virtualize the segment-caching properties of the x86 architecture. The following descriptions are limited to shadow descriptors for simplicity, although they generally also apply to cached descriptors. When the BT unit 462 generates a translation for a set of one or more guest instructions, instructions that require VMM accesses use the segment registers containing VMM descriptors, while instructions that require guest accesses use the segment registers containing shadow descriptors. For example, the GS register may be loaded with a VMM descriptor and the DS register may be loaded with a shadow descriptor. Then, for an instruction that requires a VMM access, the BT unit may explicitly reference the GS register using a segment override prefix, while for an instruction that requires a guest access, the BT unit may implicitly reference the DS register. Thus, VMM accesses use memory segments that include the VMM memory 930, while guest accesses use memory segments that are truncated, if necessary, to exclude the VMM memory. Again, if a guest access references a linear address that is within the guest memory segment, but which is not within the truncated memory segment, a general protection fault arises and the VMM 400 gains control and emulates the guest instruction. The VMM may then return to binary translation.

Using memory segmentation to protect the VMM memory 930 as described above allows the VMM 400 to safely share the linear address space 916V of the guest software, without the guest software knowing that the address space is being shared. The VMM 400 is able to access the entire linear address space 916V, including both guest memory and VMM memory, while the guest software is prevented from accessing the VMM memory 930.

Responding to general protection faults that are caused by the truncation of guest memory segments and emulating the instructions that give rise to the faults slows down the operation of the virtual computer system, in comparison to a comparable physical computer system that does not require segment truncation. However, as long as the region of the linear address space that is occupied by the VMM memory is not used very often by the guest software, the performance gains of sharing the linear address space of the guest software far outweigh the costs of handling the faults. When the VMware products described above were developed, the most important OSs for the x86 architecture did not make much use of the upper-most 4 MB of their linear address spaces. So placing the VMM memory in this region of the address space and using the segmented memory protection mechanism described above was seen as an efficient and effective method for allowing the VMM 400 to safely and transparently share the linear address space of the guest software.

However, the protection mechanism described above is not completely efficient in all circumstances. This can be seen by referring to FIG. 5A, and comparing the guest memory segments 922G and 920G along with the corresponding truncated memory segments 922T and 920T. First, comparing the guest code segment 922G with the truncated code segment 922T shows that the second code segment portion 922W is not part of the truncated code segment, but it is part of the guest code segment. Any guest access to the second code segment portion 922W will result in a general protection fault and an emulation of the instruction that prompted the guest access. Any such guest access must be blocked, however, to protect the VMM memory 930, which completely coincides with the second code segment portion 922W. The truncation of the guest code segment 922G is completely efficient in the sense that all guest accesses that must be blocked to protect the VMM memory are blocked, and no guest accesses are blocked that don't need to be blocked.

In this same sense, the truncation of the guest data segment 920G is not completely efficient, though. The second data segment portion 920W, which is part of the guest data segment, is not part of the truncated data segment 920T, so that guest accesses to the second data segment portion are blocked. This aspect of the truncation is completely efficient because the second data segment portion coincides completely with the VMM memory 930. However, the third data segment portion 920X, which is also part of the guest data segment 920G, is also not part of the truncated data segment 920T, so that guest accesses to the third data segment portion are also blocked. But the third data segment portion does not coincide at all with the VMM memory 930. There is no need to block guest accesses to this portion, but they are blocked nonetheless. The truncation of the guest data segment 920G gives rise to general protection faults, and the resulting emulation of guest instructions for access to the third data segment portion 920X, even though such accesses pose no risk to the VMM memory 930.

This inefficiency results from the fact that the guest data segment 920G extends through and beyond the region of the linear address space that is occupied by the VMM memory 930. In this case, the guest data segment wraps around the top of the linear address space 916V, extending up to the top of the address space and continuing through to the bottom portion of the address space. In this embodiment, with the VMM memory occupying the top of the linear address space, any guest memory segment that wraps around the top of the linear address space 916V, such as the guest data segment 920G, will lead to inefficiencies in the sense described above. A memory segment can only wrap around the top of the linear address space if it has a non-zero base. As mentioned above, the OSs that were most important when the earlier VMware products were developed made very little use of the top 4 MB of their linear address spaces. Memory segments with non-zero bases were even less common, so it was very uncommon for a memory segment to wrap around the top of the address space, causing the inefficiency described above. Therefore, again, the segmented memory protection mechanism described above was an efficient, effective method to allow the VMM to share the linear address space of the guest software.

Recent changes to the Linux OS, however, have increased that OS's use of the upper 4 MB of its address space and the changes have increased the use of memory segments with non-zero bases that wrap around the top of the address space. As a result, the segmented memory protection mechanism described above is not as efficient for the newer versions of Linux as it is for older versions of Linux.

One recent change to Linux that leads to inefficiencies in the protection mechanism involves the adoption of the Native POSIX (Portable Operating System Interface for Unix) Thread Library (NPTL). The purpose of the NPTL is to improve the performance of threaded applications on the Linux OS. With the NPTL, all of the threads of an application share a single linear address space, but each thread has its own instruction pointer, register set and stack. A separate portion of the address space is set aside for use as a stack for each of the threads of an application. Each thread typically also uses some memory for local storage, which is often used both by the NPTL and by application code.

In other architectures, the NPTL allocates different registers to point to local storage for different threads of an application. In the x86 architecture, however, because of the limited number of general purpose registers available, the NPTL uses memory segmentation to distinguish between the local storage of the multiple threads in an application. Specifically, a different segment descriptor is created for each thread, with each descriptor defining a memory segment with a different base address and a 4 GB limit. The local storage for each thread is located at and around the base address of the respective memory segment. The GS register is loaded with different segment selectors to select the different segment descriptors to allow each thread to access its own local storage, using its own memory segment. Each thread can access its own memory segment, when its segment descriptor is loaded into the GS register, by simply applying a segment override prefix to instructions to cause a reference to the GS register.

The memory segments for local storage for all threads, except possibly one, wrap around the top of the address space, because they have non-zero base addresses and a 4 GB limit. Also, the NPTL specification allows the thread local storage to be accessed using both positive and negative offsets from the base address. If a new version of Linux is used as a guest OS 320, every time a guest access uses a negative offset to access thread local storage in a memory segment that wraps around the top of the linear address space, segment truncation will cause a general protection fault and the instruction will need to be emulated. Most of the time in these situations, the linear address that is being referenced will not be in the same region of the linear address space 916V as the VMM memory 930. The VMM 400 will truncate the memory segments for the thread local storage to protect the VMM memory 930, but the truncation will block many guest accesses that do not put the VMM memory at risk.

This predicament is generally illustrated in FIG. 5B. FIG. 5B shows the linear address space 916V of the guest software, including the VMM memory 930. FIG. 5B also shows a set of seven exemplary guest data segments, defined by guest segment descriptors, along with a set of seven corresponding data segments that would be created by the protection mechanism described above. A first data segment 940 has a non-zero base address and a limit such that the data segment 940 does not extend into the region of the linear address space 916V that is occupied by the VMM memory 930. Thus, there is no need to truncate the first data segment 940. The limit of the guest segment descriptor for the data segment 940 is copied directly into the corresponding shadow descriptor. A second data segment 942 has a base address of zero and a limit such that, again, the data segment 942 does not extend into the region of the address space that is occupied by the VMM memory. There is no need to truncate the second data segment 942 either, when creating a corresponding shadow descriptor.

A third data segment 944, which is a so-called "flat" segment, has a base address of zero and extends the entire 4 GB of the linear address space 916V. The third data segment 944 comprises a first data segment portion 944A that does not coincide with the VMM memory 930 and a second data segment portion 944B that does coincide with the VMM memory. Under the protection mechanism described above, the third data segment 944 is truncated at the top of the first data segment portion 944A, so that the truncated data segment includes only the first data segment portion 944A, and not the second data segment portion 944B. The first, second and third data segments 940, 942 and 944 do not lead to inefficiencies in the protection mechanism because only guest accesses that need to be blocked are, in fact, blocked.

FIG. 5B also shows four data segments that do lead to inefficiencies in the protection mechanism. A fourth data segment 946, a fifth data segment 947, a sixth data segment 948 and a seventh data segment 949 all have different base addresses and a 4 GB limit. These four data segments, along with the third data segment 944, are representative of the type of data segments created by the NPTL for local storage for different threads of an application. Thus, the third data segment 944 might be for local storage for a first thread of an application, the fourth data segment 946 might be for local storage for a second thread of the application, the fifth data segment 947 might be for local storage for a third thread of the application, the sixth data segment 948 might be for local storage for a fourth thread of the application, and the seventh data segment 949 might be for local storage for a fifth thread of the application.

Each of the four data segments 946, 947, 948 and 949 includes three data segment portions, a first of which occupies the address space between the base address of the respective data segment and the base address of the VMM memory 930, a second of which coincides completely with the VMM memory, and a third of which extends from a linear address of zero back up to the base address of the respective data segment. Thus, the fourth data segment 946 comprises a first data segment portion 946A, a second data segment portion 946B and a third data segment portion 946C; the fifth data segment 947 comprises a first data segment portion 947A, a second data segment portion 947B and a third data segment portion 947C; the sixth data segment 948 comprises a first data segment portion 948A, a second data segment portion 948B and a third data segment portion 948C; and the seventh data segment 949 comprises a first data segment portion 949A, a second data segment portion 949B and a third data segment portion 949C.

Each of the first data segment portions 946A, 947A, 948A and 949A covers the same region of the linear address space 916V as the corresponding truncated data segment covers under the above protection mechanism. Thus, guest accesses in these first data segment portions are not blocked under the above protection mechanism. Each of the second data segment portions 946B, 947B, 948B and 949B covers the region of the address space that is occupied by the VMM memory 930. These second data segment portions are not included in the truncated data segments, so guest accesses to these second data segment portions are blocked under the above protection mechanism. This blocking of guest accesses does not lead to inefficiencies in the protection mechanism, because the guest accesses must be blocked to protect the VMM memory. Each of the third data segment portions 946C, 947C, 948C and 949C covers a region of the linear address space 916V that is not included in the corresponding truncated data segment, but which does not coincide with the VMM memory 930. Any guest access to one of these third data segment portions will be blocked by the above protection mechanism, even though these guest accesses do not pose any risk to the VMM memory. Thus, these third data segment portions represent possible inefficiencies in the sense described above, for the above protection mechanism.

If the data segments 946, 947, 948 and 949 represent memory segments for local storage for different threads of an application under the NPTL, then any attempted access to these memory segments using a negative offset is an attempted access to the corresponding third data segment portion 946C, 947C, 948C and 949C. Thus, any such attempted access would be blocked by the above protection mechanism, even though it does not pose a risk to the VMM memory 930. Depending on the programming of particular applications, such as whether or not the applications are programmed to use negative offsets to access local storage for threads, threaded applications that run under the NPTL of the new Linux OSs may cause substantial inefficiencies in the operation of the above protection mechanism due to a substantial number of unnecessary general protection faults, followed by the unnecessary emulation of instructions.

A second change that has been made to newer versions of Linux, and which leads to inefficiencies in the operation of the above protection mechanism, involves the introduction of a "vsyscall" form of system calls. Older versions of Linux have implemented system calls using a software interrupt instruction (INT 80). Newer processors, however, provide special instructions that yield improved performance for system calls. The x86 architecture, for example, has introduced the instructions SYSENTER and SYSEXIT for this purpose. Linux developers naturally wanted to take advantage of the improved performance of these new instructions, but they also wanted to ensure that newer versions of Linux still work on older versions of processors that do not implement these instructions.

The Linux developers modified the kernel so that the kernel maps a single page in the kernel address space as a user-readable "vsyscall" page. If the kernel determines that it is running on a processor that implements the new system call instructions, the kernel adds a system call routine to the vsyscall page that uses the SYSENTER instruction. If, on the other hand, the kernel determines that the processor on which it is running does not implement the new system call instructions, the kernel adds a system call routine to the vsyscall page that uses the INT 80 instruction. Using this technique, user code can make a system call by simply calling to a particular location in the vsyscall page. The vsyscall page is set up to take advantage of the new system call instructions if they are supported by the particular processor, or to use the software interrupt if the new instructions are not supported.

Unfortunately, the Linux developers decided to place the vsyscall page on the second to last page in the linear address space, which is within the region of the linear address space that is occupied by the VMM 400 in the VMware products described above. Thus, the above protection mechanism causes a general protection fault every time the guest software makes a system call. In addition, the CPL change code that is used during a system call for switching from user mode to a more-privileged CPL and for switching from a privileged CPL back to user mode is also placed on the vsyscall page. When switching back to user mode from supervisor mode, a few instructions are executed in the vsyscall page after the CPL has changed to a value of 3. The VMM 400 cannot execute these instructions directly on the system hardware because the protection mechanism would generate faults. So the VMM 400 is not able to switch back to direct execution as soon as the guest software returns to a CPL of 3. Instead, the VMM 400 might remain in binary translation mode until execution leaves the vsyscall page.

In the earlier VMware products in which the BT unit 462 always executes at a CPL of 1, when binary translation is used for guest code that executes at a CPL of 3, the translated code should not be allowed to access guest memory that requires a supervisor privilege level. However, because the translated code is executed at a CPL of 1, it will be able to access both user privilege level and supervisor privilege level memory pages (privilege level settings for memory pages are described in greater detail below). In these earlier VMware products, a separate user-level shadow page table is maintained that includes shadow PTEs for memory pages that are accessible with a user privilege level, but it does not include any shadow PTEs that correspond with guest PTEs that require a supervisor privilege level. When this user-level shadow page table is used, guest accesses are only allowed to access user privilege level memory, which is appropriate, because the guest software is supposed to be executing at a CPL of 3. Thus, in these earlier VMware products, when the BT unit 462 switches from executing code that corresponds with supervisor-level guest software to executing code that corresponds with user-level guest software, the normal shadow page table that includes shadow PTEs for both user privilege level memory and supervisor privilege level memory must be replaced by the user-level shadow page table that only includes PTEs for user privilege level memory, and the TLB must be flushed, to ensure that the user-level guest software is not able to access supervisor privilege level memory.

In view of the recent changes to the Linux OS, if a newer version of the OS is running as the guest OS 320 in a virtual computer system, there will be substantially more guest accesses to the upper 4 MB of the linear address space of the guest software than there would be if the VM 300 were running an older version of Linux. This will lead to an increased number of general protection faults and emulations of instructions when using the above protection mechanism to safeguard the VMM memory 930. In addition, there is likely to be a substantially greater number of guest accesses that cause a general protection fault and an emulation of the guest instruction, even when the guest access does not pose a risk to the VMM memory 930, due to memory segments that wrap around the top of the linear address space. The added faults and resulting emulation of instructions may significantly slow down the operation of the virtual computer system. What is needed therefore is a protection mechanism that allows a VMM to safely and transparently share a linear address space of a guest, but which is more efficient for OSs that make increased use of portions of the upper 4 MB of their linear address space and that use more memory segments that wrap around the top of the linear address space. This invention provides such a mechanism.

SUMMARY OF THE INVENTION

The invention comprises a method performed in a computer system for enabling a first software entity to use an address space of a second software entity while preventing the second software entity from accessing memory of the first software entity. The computer system implements segmented memory and memory paging. The computer system also has a first operating mode in which instructions are sometimes executed at a more-privileged level and sometimes at a less-privileged level and in which a first set of one or more instructions accesses the memory of the first software entity and a second set of one or more instructions is to be prevented from accessing the memory of the first software entity. The computer system also has a second operating mode in which instructions are executed at a less-privileged level and in which a third set of instructions is to be prevented from accessing the memory of the first software entity. The method comprises the following steps: during the first operating mode, using effectively truncated memory segments for the second set of instructions, the effectively truncated memory segments excluding the memory of the first software entity; during the first operating mode, if memory paging protection is active, deactivating memory paging protection before executing instructions at the less-privileged level; during the second operating mode, if memory paging protection is inactive, using completely truncated memory segments for the third set of instructions, the completely truncated memory segments excluding the memory of the first software entity; at some time when instructions are not being executed at the less-privileged level in the first operating mode, activating memory paging protection so that, during the second operating mode, instructions executed at the less-privileged level cannot access the memory of the first software entity; and, during the second operating mode, if memory paging protection is active, using one or more untruncated memory segments for the third set of instructions, at least one of the untruncated memory segments including at least a portion of the memory of the first software entity.

In some embodiments of the invention, the first software entity is a virtualization software and the second software entity is a guest software. In some of these embodiments, the second operating mode involves directly executing the third set of instructions, which is from the guest software. Further, in some of these embodiments, the first operating mode involves executing translated instructions that are translated from guest instructions from the guest software and the second set of instructions involves guest accesses.

Also, in some embodiments of the invention, the method further comprises the following steps: when transitioning from the second operating mode to the first operating mode, activating a first set of memory segments that includes the completely truncated memory segments, if the first set of memory segments is not already active; when transitioning from the first operating mode to the second operating mode, if memory paging protection is active, activating a second set of memory segments that includes the untruncated memory segments, wherein the second set of memory segments is distinct from the first set of memory segments; and, during the second operating mode, if memory paging protection is activated, activating the second set of memory segments that includes the untruncated memory segments. In some of these embodiments, the memory segments in the first set are defined by entries in a first memory segment table and the memory segments in the second set are defined by entries in a second memory segment table, and the step of activating the first set of memory segments comprises activating the first memory segment table and the step of activating the second set of memory segments comprises activating the second memory segment table.

Also, in some embodiments of the invention, if memory paging protection is active during the second operating mode, one or more truncated memory segments are detruncated in response to a protection fault. Also, in some embodiments of the invention, during the first operating mode, one or more untruncated memory segments are truncated in response to an attempt by the second software entity to activate the respective memory segments. Also, in some embodiments of the invention, memory paging protection is activated to protect the memory of the first software entity by preventing access to multiple, noncontiguous portions of the address space. Also, in some embodiments of the invention, the memory of the first software entity occupies a highest-address portion of the address space. Finally, in some embodiments of the invention, the computer system is based on an x86 processor architecture.

DETAILED DESCRIPTION

This invention relates to a method that may be implemented in a computer system to enable a first software entity to share a linear address space of a second software entity, without the second entity knowing that the first entity is occupying a part of its address space, and while protecting the memory of the first entity from attempted memory accesses of the second entity. The computer system has a first operating mode in which one or more instructions access the memory of the first entity and one or more other instructions are to be prevented from accessing the memory of the first entity, along with a second operating mode in which no instructions are permitted to access the memory of the first entity. The method involves the use of both a segmented memory protection mechanism and a memory paging protection mechanism.

A particular embodiment of the invention is described in terms of a particular virtual computer system, in which the first software entity is a VMM and the second software entity is a guest OS that is running on a VM. In this embodiment, the first operating mode involves binary translation, while the second operating mode involves the direct execution of guest instructions. The invention also applies to other virtual computer systems, and to conventional, non-virtualized computer systems, and the operating modes involved in these other computer systems may be different from the binary translation and direct execution modes of the described embodiment. Also, the described embodiment is based on the x86 architecture, although the invention also applies to other processor architectures. For example, the invention may also be implemented in a computer system based on the AMD64 platform from Advanced Micro Devices, Inc. (AMD) or the Extended Memory 64 Technology (EM64T) platform from Intel Corporation, when using the legacy mode. In addition, the invention may be used with a revision D model of the Opteron microprocessor from AMD, when the processor is operating in the long mode. In this mode of this processor, AMD adds a segmentation-like facility that allows some forms of segment truncation, which can be used to implement this invention.

Figure 1:
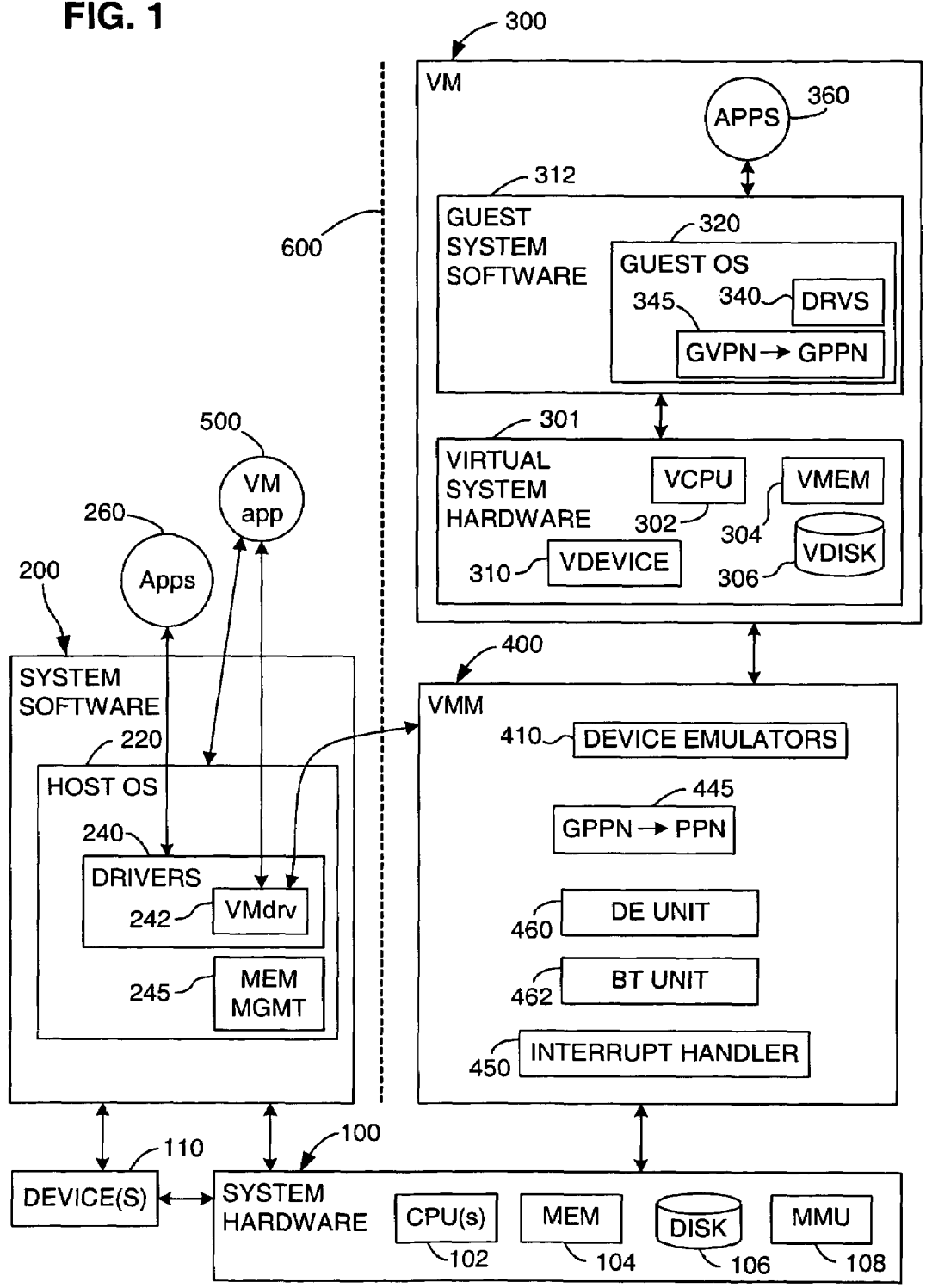
FIG. 1 illustrates a virtual computer system installed on a host platform, with a virtual machine monitor (VMM) at the same system level as the host operating system.
Figure 2:
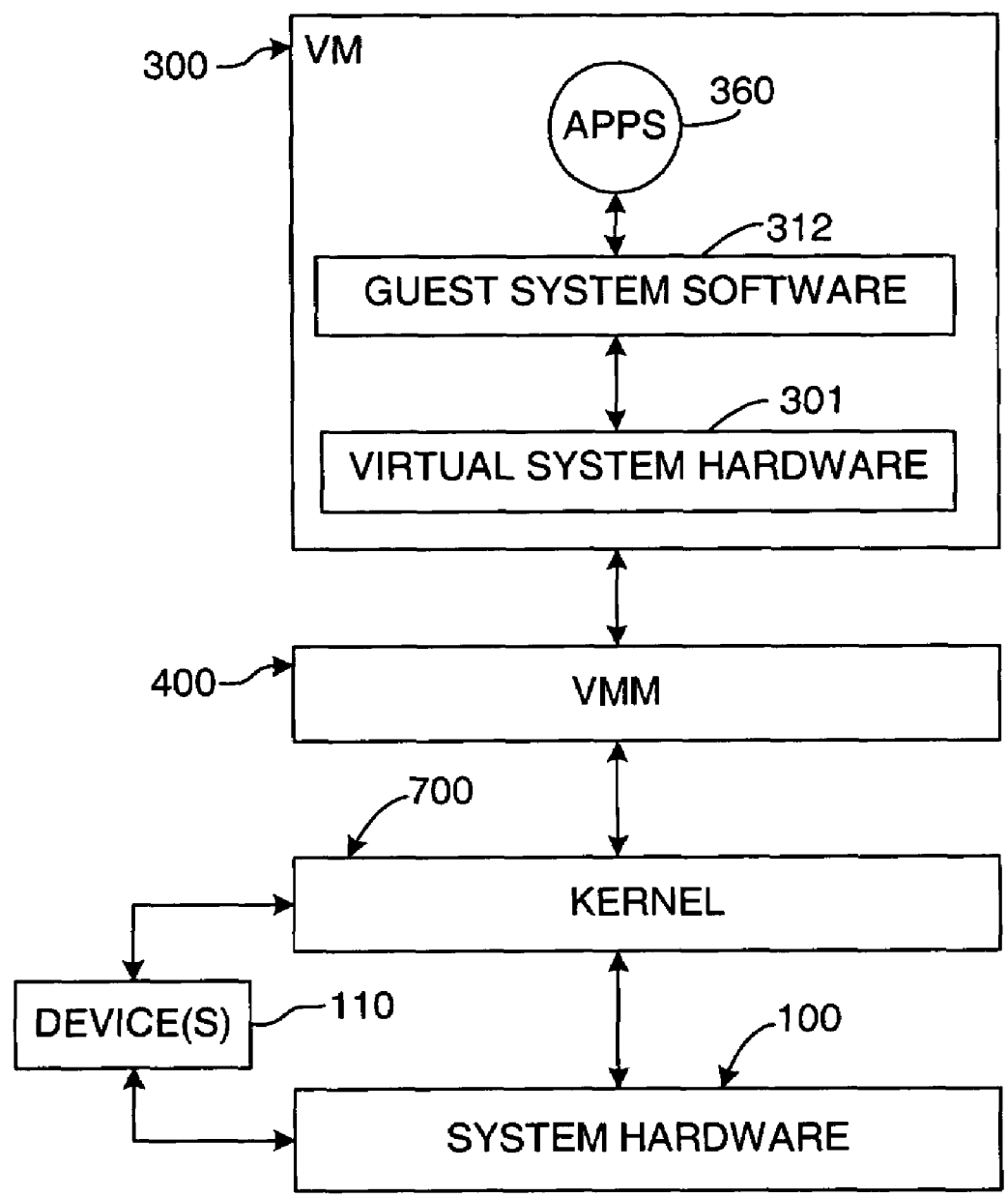
FIG. 2 illustrates an alternative configuration of a virtual computer system, which includes a kernel on which the VMM runs.

FIG. 1 illustrates a virtual computer system in which this invention may be implemented. The system of FIG. 1 was described above in the Background of the Invention section of this patent. The VMM 400 executes on the system hardware 100, and supports the VM 300. The guest OS 320 runs on the VM 300, along with guest applications 360. The guest OS 320 and the guest applications 360 are referred to collectively as guest software, and the instructions that make up the guest software are referred to as guest instructions.

Figure 5A:
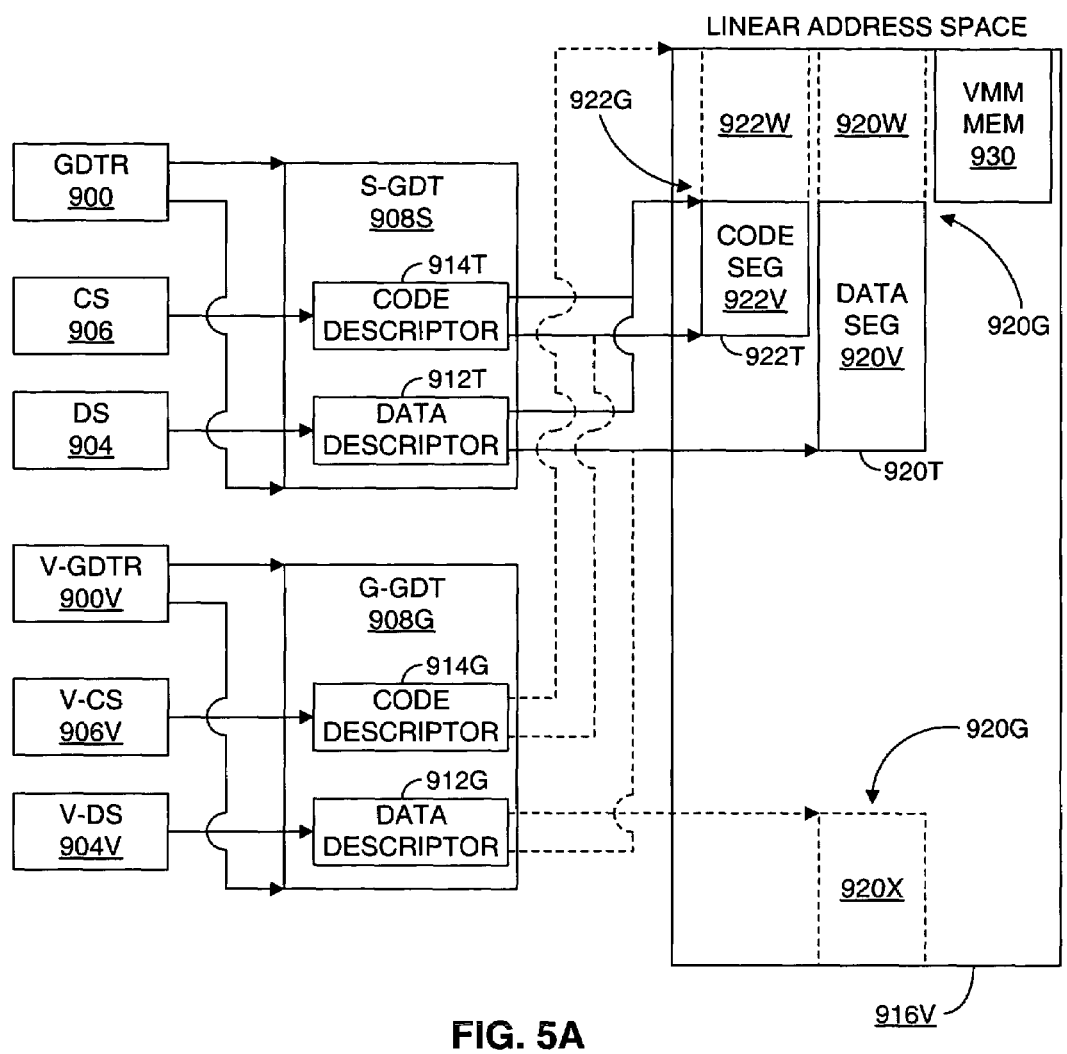
FIG. 5A illustrates a technique that has been used in existing virtualization products to protect VMM memory from guest software when sharing the linear address space of the guest software.
Figure 5B:
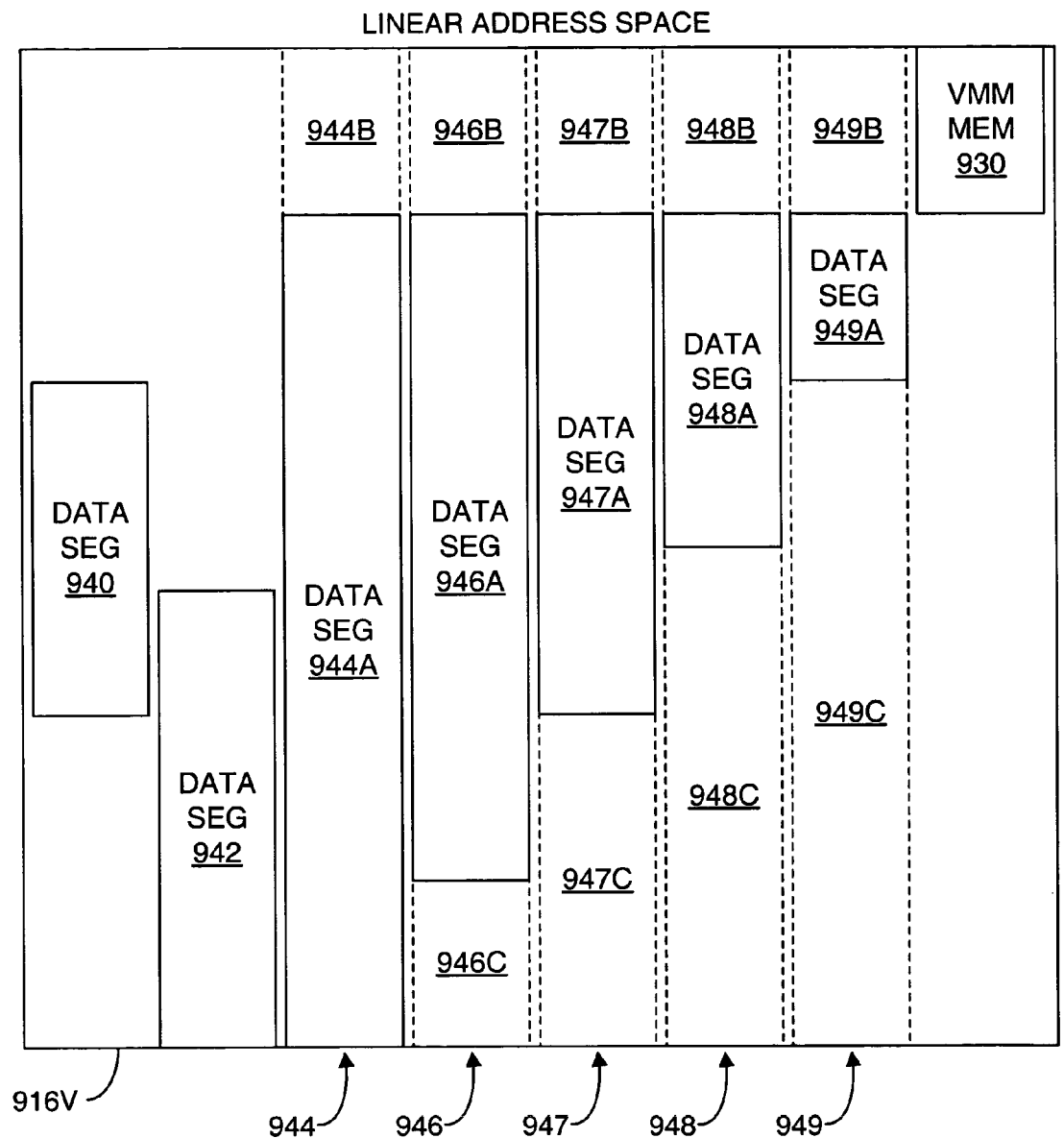
FIG. 5B illustrates the selective truncation of a variety of possible guest memory segments.

As illustrated in FIG. 5A, the VMM 400 occupies the upper-most region of the linear address space 916V of the guest software. The VMM 400 has a direct execution unit 460 for directly executing guest instructions on the system hardware 100, and a binary translation unit 462 for generating and executing translations of guest instructions. The VMM 400 switches control back and forth between the DE unit 460 and the BT unit 462, generally using direct execution for user-level guest software and using binary translation for supervisor code. In this embodiment of the invention, memory segmentation is used to protect the VMM memory while the BT unit is active, and either memory segmentation or the memory paging mechanism may be used to protect the VMM memory while the DE unit is active.

Figure 6:
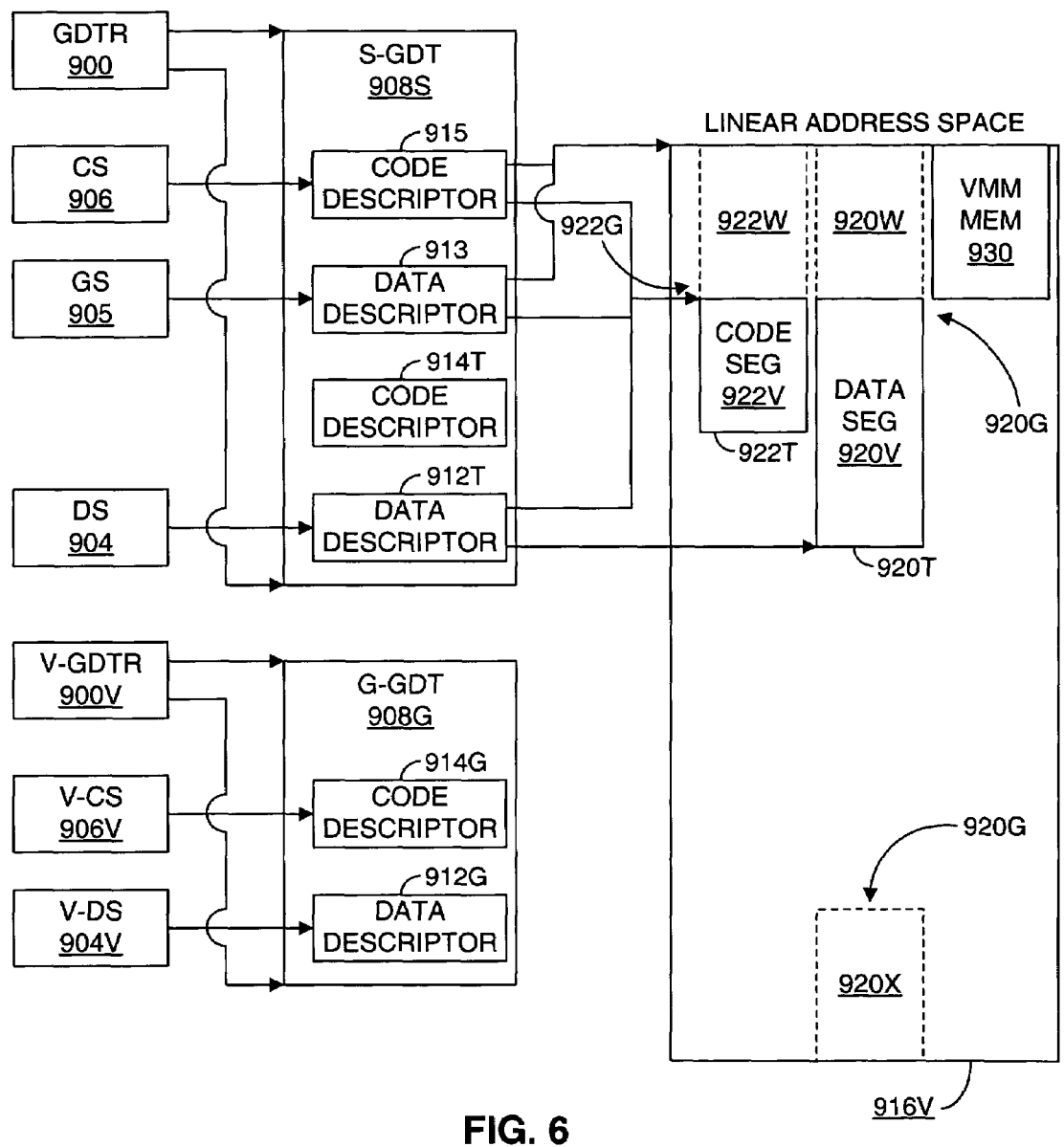
FIG. 6 illustrates the general operation of this invention for protecting VMM memory from guest software, when the VMM is executing binary translated code.

FIG. 6 illustrates the segmented memory protection mechanism that is used in this embodiment of the invention to protect the VMM memory during binary translation. Except as described below, this protection mechanism is substantially the same as the segmented memory protection mechanism that is described above in the Background of the Invention section of this patent. Accordingly, FIG. 6 is substantially similar to FIG. 5A, and the description of FIG. 5A above generally also applies to FIG. 6.

FIG. 6 shows the linear address space 916V of the guest software, along with the guest GDT 908G, the shadow GDT 908S and selected registers of the virtual system hardware 301 and the physical system hardware 100. FIG. 6 also shows the VMM memory 930 occupying the upper 4 MB of the address space of the guest software. The guest GDT 908G contains a guest code descriptor 914G, which defines a guest code segment 922G that includes a first code segment portion 922V and a second code segment portion 922W. The guest GDT also contains a guest data descriptor 912G, which defines a guest data segment 920G that includes a first data segment portion 920V, a second data segment portion 920W and a third data segment portion 920X. The guest GDT 908G is active in the VM 300, as selected by the virtual GDTR 900V, and the guest code descriptor 914G is loaded into the virtual CS register 906V, while the guest data descriptor 912G is loaded into the virtual DS register 904V.

The physical system hardware 100, however, uses the shadow GDT 908S to define memory segments in the linear address space 916V, as selected by the GDTR 900. The shadow GDT 908S includes a shadow code descriptor 914T that is derived from the guest code descriptor 914G and a shadow data descriptor 912T that is derived from the guest data descriptor 912G. All the data in these guest descriptors is copied into the corresponding shadow descriptors, except for a few possible modifications. One such modification is that the memory segments that are defined by the shadow descriptors are generally truncated, if necessary, to protect the VMM memory 930 from "guest accesses," as that term is defined above. Thus, the shadow code descriptor 914T defines the truncated code segment 922T that generally corresponds to the guest code segment 922G, except that the truncated code segment is truncated to protect the VMM memory 930. More specifically, the limit of the shadow code descriptor 914T is set at a value that indicates the top of the first code segment portion 922V, which is immediately below the beginning of the VMM memory 930. Similarly, the shadow data descriptor 912T defines the truncated data segment 920T that generally corresponds to the guest data segment 920G, except that the truncated data segment is truncated to protect the VMM memory 930. Thus, the limit of the shadow data descriptor 912T is set at a value that indicates the top of the first data segment portion 920V, which is immediately below the beginning of the VMM memory 930.

The shadow GDT 908S also includes a VMM code descriptor 915 and a VMM data descriptor 913. These VMM descriptors 915 and 913 are used by the VMM 400 and define the region of the linear address space 916V that is occupied by the VMM memory 930. Thus, both of the VMM descriptors 915 and 913 contain a base address that points to the beginning of the VMM memory 930 and a limit that indicates the top of the linear address space. The DPL for the VMM descriptors 915 and 913 is set to a privileged level so that the descriptors cannot be loaded or used by guest software running in user mode using the DE unit 460.

When running in binary translation mode, the VMM 400 loads the VMM code descriptor 915 into the CS register 906 as shown in FIG. 6, so that instructions are fetched from the VMM memory 930. The VMM 400 also loads the VMM data descriptor 913 into the GS register 905 and the shadow data descriptor 912T into the DS register 904, as also shown in FIG. 6. The VMM 400 then uses segment override prefixes to cause VMM data accesses to reference the GS register 905 to gain access to the VMM memory 930. Guest data accesses, meanwhile, implicitly reference the DS register 904. Thus, guest accesses use the truncated data segment 920T, which is truncated to prevent guest accesses from accessing the VMM memory 930. As described above, if a guest access is directed to a linear address that is within the guest data segment 920G, but not within the truncated data segment 920T, a general protection fault arises and the VMM 400 emulates the instruction that gave rise to the fault.

Using the technique illustrated in FIG. 6, the VMM 400 is able to access VMM code and data within the VMM memory 930, along with guest data within the guest data segment 920G (using emulation for data that is outside the truncated data segment 920T). The VMM 400 can also load other shadow descriptors into the DS register 904, as needed, to access other guest data segments. The technique illustrated in FIG. 6 also protects the VMM memory 930 from guest accesses that might otherwise corrupt the VMM memory. Thus, the technique illustrated in FIG. 6 allows the VMM to safely and transparently share the linear address space 916V of the guest software during binary translation.

Figure 7:
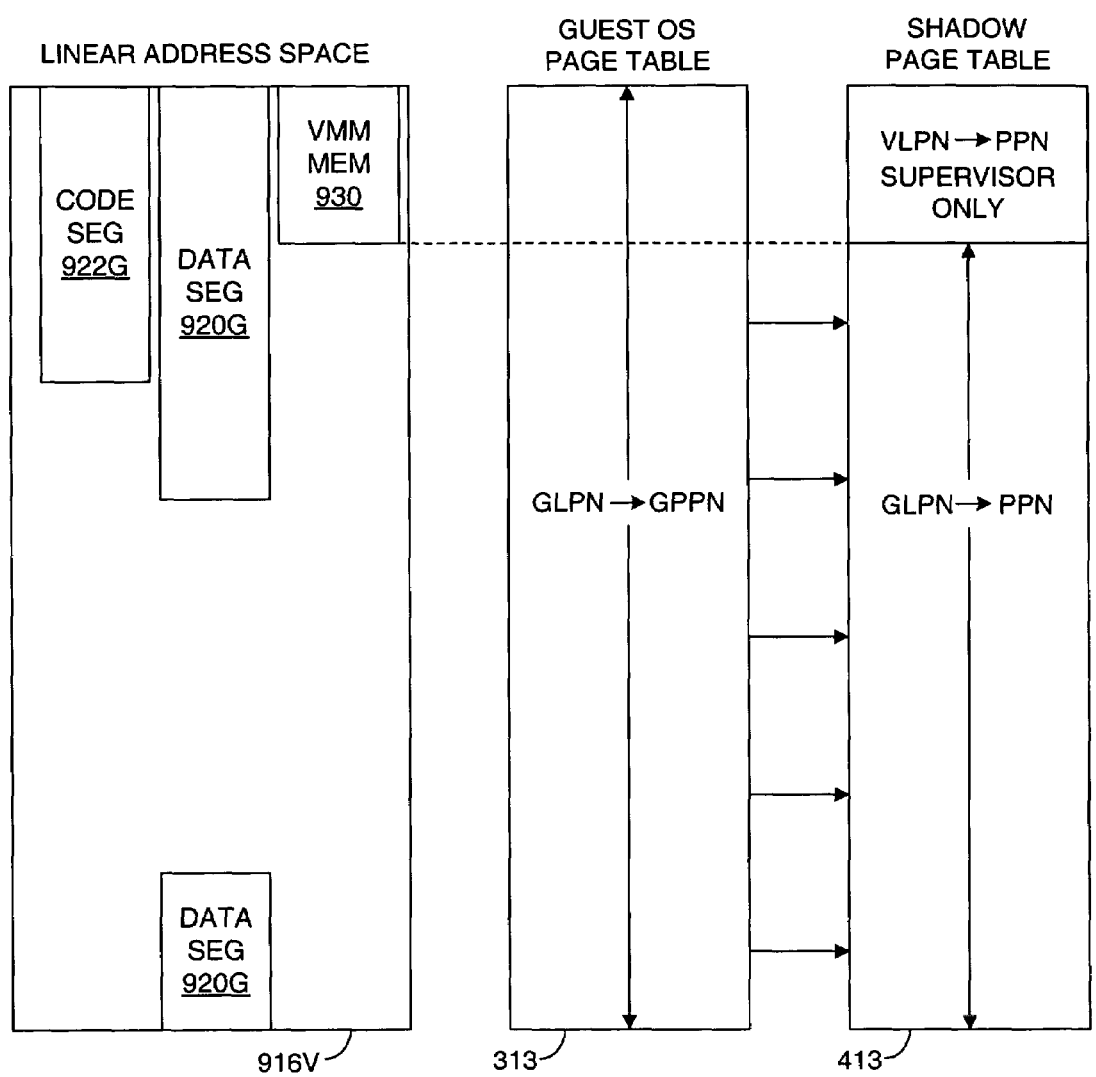
FIG. 7 illustrates the general operation of this invention for protecting VMM memory from guest software, when the VMM is directly executing guest instructions.

During direct execution, however, this embodiment of the invention may rely on a memory paging mechanism to protect the VMM memory 930 from guest software. The memory paging mechanism of the x86 architecture is described above, along with the use of a memory paging mechanism in a virtual computer system. FIG. 7 illustrates the use of the paging mechanism to protect the VMM memory.

Figure 3:
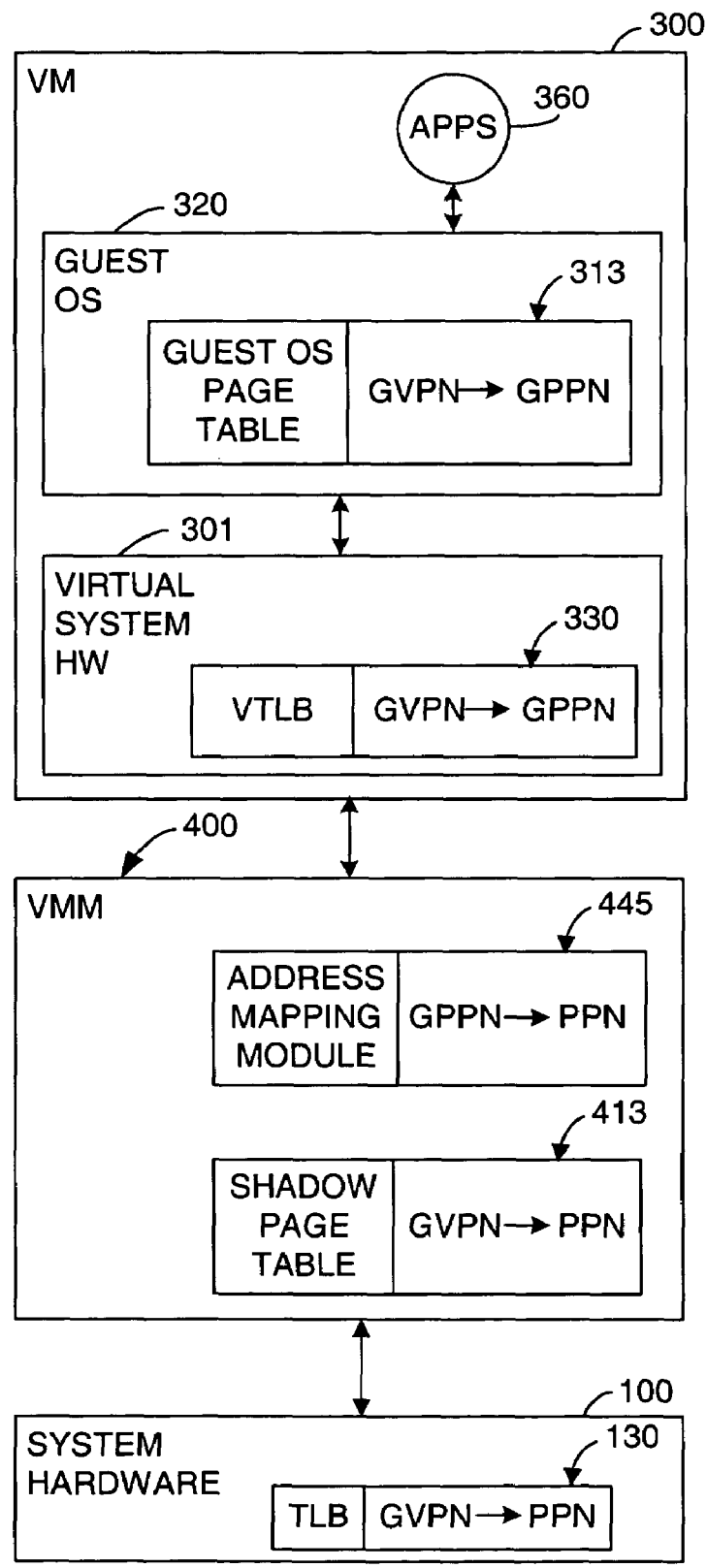
FIG. 3 illustrates an extra level of address indirection when mapping virtual memory addresses in a virtual computer system.
Figure 4:
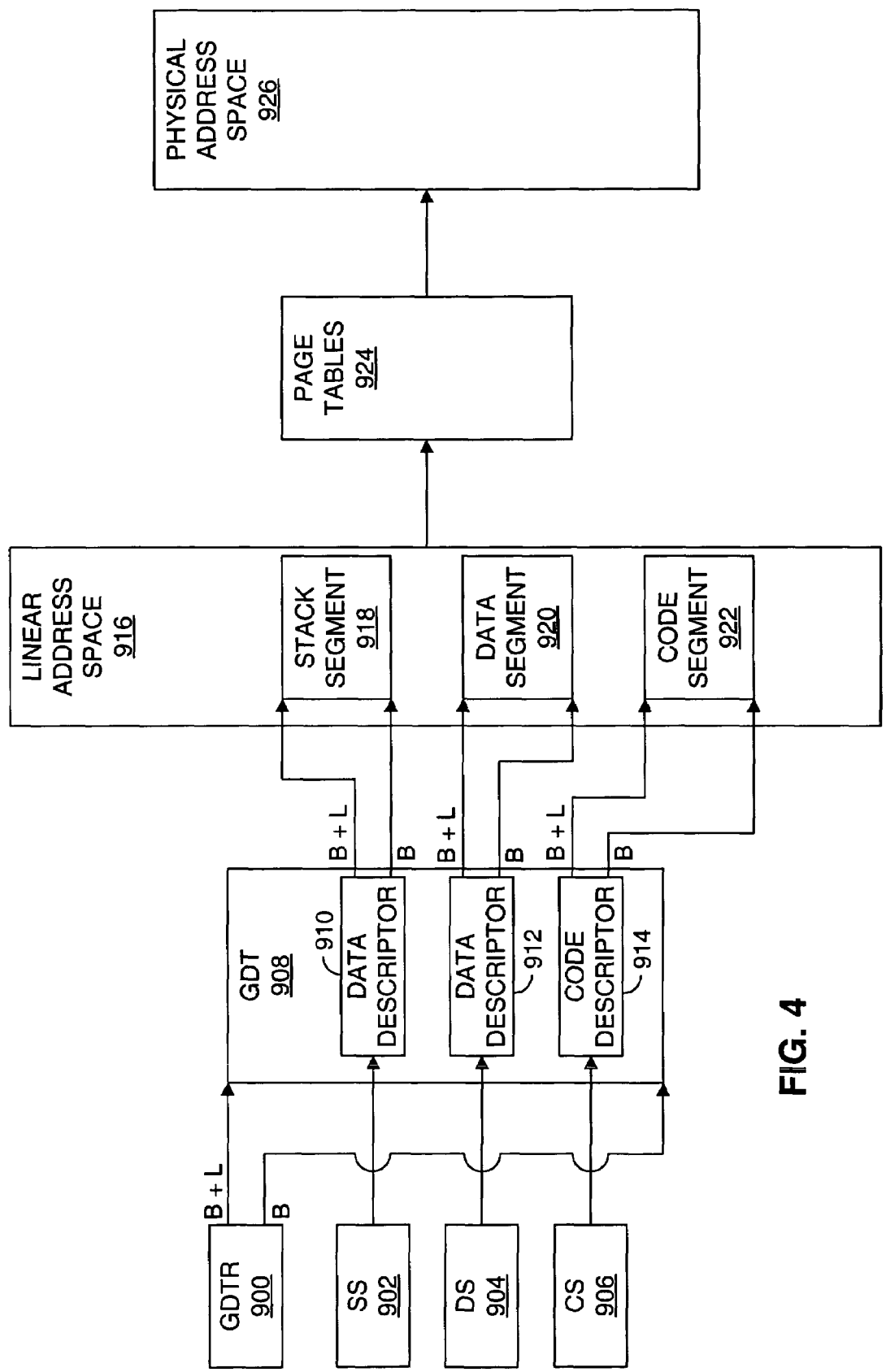
FIG. 4 illustrates an implementation of segmented memory according to the x86 architecture.

FIG. 7 illustrates the same linear address space 916V of the guest software as is shown in FIGS. 5A and 6, including the VMM memory 930 in the upper-most portion of the linear address space, along with the guest code segment 922G and the guest data segment 920G. FIG. 7 also shows a guest OS page table 313 and a shadow page table 413, as described above in connection with FIG. 3. The page tables 313 and 413 may actually comprise a set of page tables along with a page directory, using the terminology of the x86 architecture, but a single page table is illustrated and described in each case to simplify this description. The guest OS page table 313, which is controlled by the guest OS 320 provides translations from GLPNs to GPPNs, as described above, for the entire linear address space 916V. However, as also described above, these translations are not used by the physical system hardware 100. Instead, the system hardware 100 uses translations from the shadow page table 413, which is under the control of the VMM 400.

The guest software may attempt to access any memory page within the linear address space 916V, using an appropriate linear page number, which is referred to as a GLPN in this patent. The VMM 400 may also attempt to access memory pages within the linear address space 916V, also using appropriate linear page numbers. The acronym GLPN stands for "Guest Linear Page Number," though, which could cause some confusion if it were used with reference to such an attempted access by the VMM. Accordingly, the acronym LPN, which stands for "Linear Page Number," is used as a more general reference, referring to a linear page number in the linear address space 916V issued either by the VMM or the guest software.

For LPNs that do not correspond with the linear address space that is occupied by the VMM memory 930, shadow PTEs (page table entries) in the shadow page table 413 are derived from corresponding guest PTEs in the guest OS page table 313. The primary difference between the guest PTEs and their corresponding shadow PTEs is that the guest PTEs map GLPNs to GPPNs, while the corresponding shadow PTEs map the GLPNs to the actual PPNs that are used in the physical system hardware 100.

For LPNs that do correspond with the linear address space that is occupied by the VMM memory 930, the VMM 400 inserts its own translations into the shadow page table 413, so that the VMM can use its own LPNs to access its own memory 930. Thus, for this region of the address space, the shadow page table 413 contains translations from VMM LPNs (VLPNs) to PPNs, as shown in FIG. 7.

As described in the IA-32 Manual, PTEs in the x86 architecture include a user/supervisor flag that indicates either a user or supervisor privilege level for the corresponding memory page. When a PTE indicates a user privilege level for a memory page, software running at any CPL may access the page. When a PTE indicates a supervisor privilege level for a memory page, an instruction may only access the page if the CPL has a value of 0, 1 or 2 (or if the instruction implicitly gains supervisor access rights). In this embodiment of the invention, for PTEs that correspond to LPNs in the region of the address space that is occupied by the VMM memory 930, the user/supervisor flag is set to indicate a supervisor privilege level. As described above, direct execution is only used for guest software that executes at a CPL of 3. Therefore, in direct execution, the guest software cannot access the physical memory pages that contain the VMM memory 930.

If, during direct execution, the guest software attempts to access a GLPN that falls within the region of the linear address space that is occupied by the VMM 400, the memory paging mechanism would cause a page fault. As with the general protection faults caused by the segment protection mechanism, the VMM 400 responds to the fault and emulates the instruction that gave rise to the fault. The VMM 400 then generally resumes the direct execution of guest instructions.

As described above, this invention uses two different protection mechanisms to protect the VMM memory 930 from guest accesses. In this embodiment, the invention uses the memory segmentation mechanism to protect the VMM memory during binary translation, and it may use either the memory segmentation mechanism or the memory paging mechanism to protect the VMM memory during direct execution.

The memory segmentation mechanism is used during binary translation because that mechanism provides a more efficient method to allow VMM accesses to reach the VMM memory 930 and to allow guest accesses to reach the guest memory, while preventing guest accesses from reaching the VMM memory. As described above, a first set of memory segments is set up that allows access to the VMM memory, and VMM accesses are caused to access memory using this first set of memory segments. Also, a second set of memory segments is set up that allows access to the guest memory, but does not allow access to the VMM memory, and guest accesses are caused to access memory using the second set of memory segments. Segment override prefixes are used, as necessary, to ensure that VMM accesses go through the first set of memory segments and guest accesses go through the second set of memory segments. Thus, the VMM 400 is allowed to access its own memory and the guest is allowed to access its own memory, while guest accesses are prevented from accessing the VMM memory, all without having to change address spaces.

Under the memory segmentation mechanism, the DPL of a memory segment can be set to any of the four privilege levels of the x86, while, under the memory paging mechanism, a memory page may only be set to either user privilege level or supervisor privilege level. Also, having six different segment registers allows for the contemporaneous use of up to six different memory segments, and the use of segment overrides in binary translated instructions can allow some instructions to use some memory segments that allow access to VMM memory, while other instructions use other memory segments that do not allow access to VMM memory. Overall, the memory segmentation mechanism provides a flexible technique for providing contemporaneous access to both VMM memory and guest memory during binary translation, while preventing guest accesses from reaching VMM memory.

Memory segmentation also has an important disadvantage, though. As described above, for memory segments that wrap around the top of the linear address space, the memory segmentation protection mechanism may unnecessarily block some guest accesses that pose no risk to the VMM memory 930. As described above, under this mechanism, for any guest memory segment that extends into the region of the linear address space that is occupied by the VMM memory, the limit is set immediately below the beginning of the VMM memory, truncating the guest memory segment. A guest access to any portion of the guest memory segment above this limit will be blocked. For a guest memory segment that wraps around the top of the linear address space and extends upward from the bottom of the linear address space 916V, such as the third data segment portion 920X shown in FIG. 6, any guest access to the portion that extends upward from the bottom of the address space is blocked, even though it poses no risk to the VMM memory 930. Thus, the memory segmentation mechanism may not be completely efficient in protecting the VMM memory 930 in the sense that, for guest memory segments that wrap around the top of the linear address space, the mechanism may block guest accesses that pose no risk to the VMM memory. This inefficiency leads to unnecessary general protection faults and to the unnecessary emulation of guest instructions. However, for binary translation, the performance gains achieved by allowing the VMM 400 to access both VMM memory and guest memory without changing address spaces, generally outweighs the performance losses caused by these inefficiencies.

During direct execution, however, only guest software is executing, so there is no need for the VMM 400, or any other code, to access the VMM memory 930. In this case, using the memory segmentation mechanism provides no performance gains, but still has the inefficiency and resulting performance loss described above. Using the memory paging mechanism, on the other hand, does not have the same inefficiency. With the memory paging mechanism, individual memory pages can be protected from guest accesses, as necessary, leaving all other memory pages available for guest accesses. The only memory pages that give rise to faults in the event of a guest access are the memory pages that actually contain VMM memory. Even in the case of a memory segment that wraps around the top of the linear address space and a guest access to the portion of the memory segment that extends upward from the bottom of the linear address space, such as the third data segment portion 920X shown in FIG. 6, the guest access is generally able to complete successfully, without any intervention by the VMM 400. With the memory paging mechanism, there is no unnecessary blocking of guest accesses; only guest accesses to memory pages that actually contain VMM memory are blocked.

The memory paging protection mechanism provides protection at a granularity of one page, and, unlike the memory segmentation mechanism, the memory that is protected need not form a continuous memory region. Individual memory pages may be protected from guest accesses, while surrounding memory pages are available to the guest software, and, conversely, individual memory pages may be made available to guest software, while surrounding memory pages are protected. Thus, for example, the VMM memory 930 may be arranged so that the second to last page of the linear address space 916V is not used by the VMM 400. The VMM memory 930 may still be placed in the upper-most 4 MB of the linear address space, but not in the second to last page. Then, the memory paging protection mechanism may be set up so that the second to last memory page has a user privilege level, so that the guest software can access that particular page when running at a CPL of 3 during direct execution. In this case, if the guest OS 320 is a newer version of Linux, as described above, that places a vsyscall page on the second to last page of the linear address space, user level software can access the vsyscall page during direct execution to make a system call, without generating a fault from the protection mechanism. Other arrangements can be made to efficiently accommodate other guest OSs that use other areas of the linear address space. The virtualization software may be customized to efficiently accommodate a specific guest OS or it may be made more general. The virtualization software may even be designed to dynamically adjust its usage of the linear address space in response to the usage of the linear address space by a particular guest OS in a particular system configuration, with the memory paging protection mechanism efficiently blocking guest accesses only to those memory pages that are actually occupied by the virtualization software.

As described above, this embodiment of the invention uses the segment protection mechanism during binary translation, and it may use either the segment protection mechanism or the memory paging mechanism during direct execution. Either protection mechanism, by itself, provides adequate protection for the VMM memory 930, so only one mechanism need be activated at any given time. Having both mechanisms activated at the same time, however, is also acceptable. One option for implementing this general approach would be to activate the segment protection mechanism and deactivate the memory paging mechanism when entering the binary translation mode and to activate the memory paging mechanism and deactivate the memory segmentation mechanism when entering the direct execution mode. This is not the preferred option, however, for the embodiment described above.

The memory paging protection mechanism described above prevents code that is executing at user level from accessing the memory pages that contain the VMM memory 930. The mechanism has no effect, however, on code that is executing at supervisor level. In the embodiment described above, except when running user level guest software in direct execution mode, software is generally executed on the system hardware 100 at a supervisor level. In binary translation mode, in particular, code always executes at a CPL of 1 in this embodiment. Thus, the memory paging protection mechanism has no effect, except when the DE unit 460 is active. As a result, there is no need to deactivate the memory paging mechanism at any time.

The segmented memory protection mechanism, on the other hand, generally does have some effect if it is active during direct execution. For example, suppose that the guest software has created a guest memory segment that wraps around the top of the linear address space, such as the guest data segment 920G shown in FIG. 6. Suppose further that the VMM 400 creates a truncated memory segment with a limit immediately below the beginning of the VMM memory 930, such as the truncated data segment 920T. Suppose also that the VMM 400 is directly executing guest software on the system hardware 100. Now, if the guest software attempts to access a memory location in the third data segment portion 920X, the segmented memory protection mechanism will generate a general protection fault, and the faulting instruction will be emulated. In this case, the guest access did not pose a risk to the VMM memory 930, and the memory paging mechanism would not have generated a fault. Thus, if the segmented memory protection mechanism is active in this situation, and the guest data segment 920G is truncated, an unnecessary fault occurs, along with the emulation of an instruction. The faulting instruction will still be emulated correctly, so there is no functional problem introduced by the unnecessary fault, but the faulting instruction will take significantly longer to complete.

Leaving the segmented memory mechanism active during direct execution may lead to inefficiencies and performance losses, but it won't lead to any virtualization problems. Therefore, deactivating the mechanism may be viewed as an option. Deactivating the mechanism is not necessary, but it may lead to performance gains.

Figure 8:
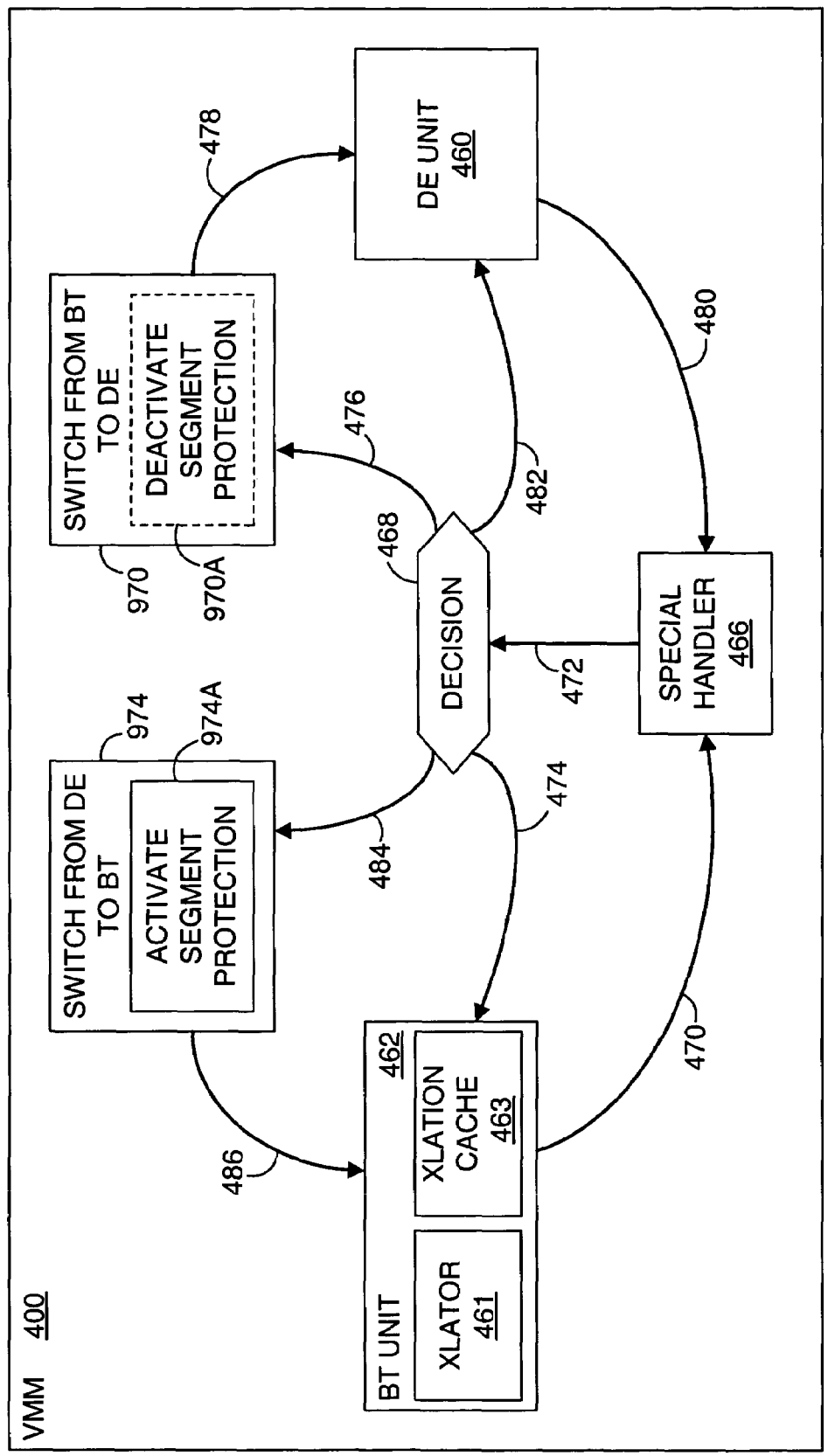
FIG. 8 illustrates the control flow for instruction execution in one particular VMM, indicating an activation and optional or selective deactivation of a segmented memory protection mechanism.

FIG. 8 illustrates a general method that is performed by the VMM 400 of the embodiment described above in support of the VM 300, including switching back and forth between directly executing guest instructions and executing binary translated instructions. Suppose initially that the BT unit 462 is active. In this embodiment, both the segmented memory protection mechanism and the memory paging protection mechanism are active during binary translation, although the memory paging mechanism has no effect on the execution of translated instructions.

FIG. 8 illustrates the BT unit 462, including a binary translator 461 and a translation cache 463. As described above, when binary translation is to be used for a set of one or more guest instructions, the BT unit 462 first checks to see if there is already a translation for the set of guest instructions in the translation cache 463. If the translation cache does not contain a translation for the set of guest instructions, then the translator 461 generates one. In either case, the translation for the set of guest instructions is executed by the BT unit 462. As also described above, this process may be repeated multiple times, so that multiple translations are executed during a single pass of binary translation.

At some point, the VMM 400 stops executing binary translated instructions, such as because of a fault. At this point, the method of FIG. 8 follows a path 470 and control switches to a special handler 466. The special handler 466 generally emulates one or more guest instructions, and then the method of FIG. 8 follows a path 472 to a decision unit 468. The decision unit 468 determines whether to return control to the BT unit 462 or to transfer control to the DE unit 460. If a decision is made to return to executing binary translations, the method of FIG. 8 follows a path 474 to return control to the BT unit 462. In the VMware products described above, the VMM 400 generally does not switch from binary translation to direct execution in response to a fault, but this possibility is illustrated in FIG. 8 for generality.

Suppose, for example, that the BT unit 462 is active and a guest access causes the segmented memory protection mechanism to generate a general protection fault. The path 470 is followed and control transfers to the special handler 466. The special handler 466 then emulates the instruction that gave rise to the fault, accessing the physical memory location that contains the required guest data. Next, the method follows the path 472 to the decision unit 468. In this case, the decision unit 468 determines that the BT unit 462 should resume operation, and the method of FIG. 8 follows the path 474 back to the BT unit 462.

If the decision unit 468 decides instead to transfer control from the BT unit 462 to the DE unit 460, the method of FIG. 8 follows a path 476 to a step 970. The step 970 may comprise one or more steps that are performed when transitioning from binary translation mode to direct execution mode. One such step, under this invention, is illustrated in FIG. 8 as a step 970A. The step 970A involves possibly deactivating the segmented memory protection mechanism.

The step 970A is shown as optional by using a dashed line. The step 970A is optional in three different senses. First, the step may sometimes be performed and other times the step may not be performed at all, so that the segment protection mechanism remains completely active throughout one or more passes of direct execution. Second, the segment protection mechanism may be partially deactivated, but not completely deactivated. Third, the timing of the deactivation of the segment protection mechanism may be varied. For example, in some embodiments, deactivation may occur before beginning the direct execution of guest instructions; in other embodiments, deactivation may occur after the direct execution of guest instructions has begun; and in other embodiments, deactivation may occur partially before direct execution begins and partially after direct execution begins. Other options are also possible, such as varying the time at which deactivation occurs for different passes through direct execution.

One method for deactivating the segmented memory protection mechanism is to "detruncate" the memory segments that result from truncating guest memory segments. A memory segment that has either been detruncated or has never been truncated is referred to as an "untruncated" memory segment. For example, referring again to the guest data segment 920G illustrated in FIGS. 5A and 6, the limit in the guest data descriptor 912G is set at the top of the third data segment portion 920X, so that the guest data segment 920G includes the first data segment portion 920V, the second data segment portion 920W and the third data segment portion 920X. However, the corresponding truncated data segment 920T that is defined by the shadow data descriptor 912T has a limit set at the top of the first data segment portion 920V, so that the truncated data segment 920T includes only the first data segment portion 920V. Now, to "detruncate" the truncated data segment 920T to obtain an "untruncated" memory segment, the limit of the shadow data segment is set back to the limit of the guest data segment 920G, so that the shadow data segment now includes the data segment portions 920V, 920W and 920X. With respect to the guest data segment 920G, the segmented memory protection mechanism has now been deactivated. The mechanism will no longer block guest accesses to memory locations that are within the guest data segment 920G, but outside the truncated data segment 920T.

The segmented memory protection mechanism may be completely deactivated by detruncating all memory segments that have been truncated under the mechanism. Alternatively, the protection mechanism may be partially deactivated by detruncating a subset of the memory segments that have been truncated under the mechanism. Now, if a guest memory segment does not extend into the region occupied by the VMM 400, there is no need to truncate the memory segment when the segmented memory protection mechanism is active, and so there is no need to detruncate the memory segment when the mechanism is deactivated. Various embodiments of this invention involve different strategies for truncating memory segments to partially or completely activate the segmented memory protection mechanism and for using untruncated memory segments to partially or completely deactivate the protection mechanism.

Figure 9A:
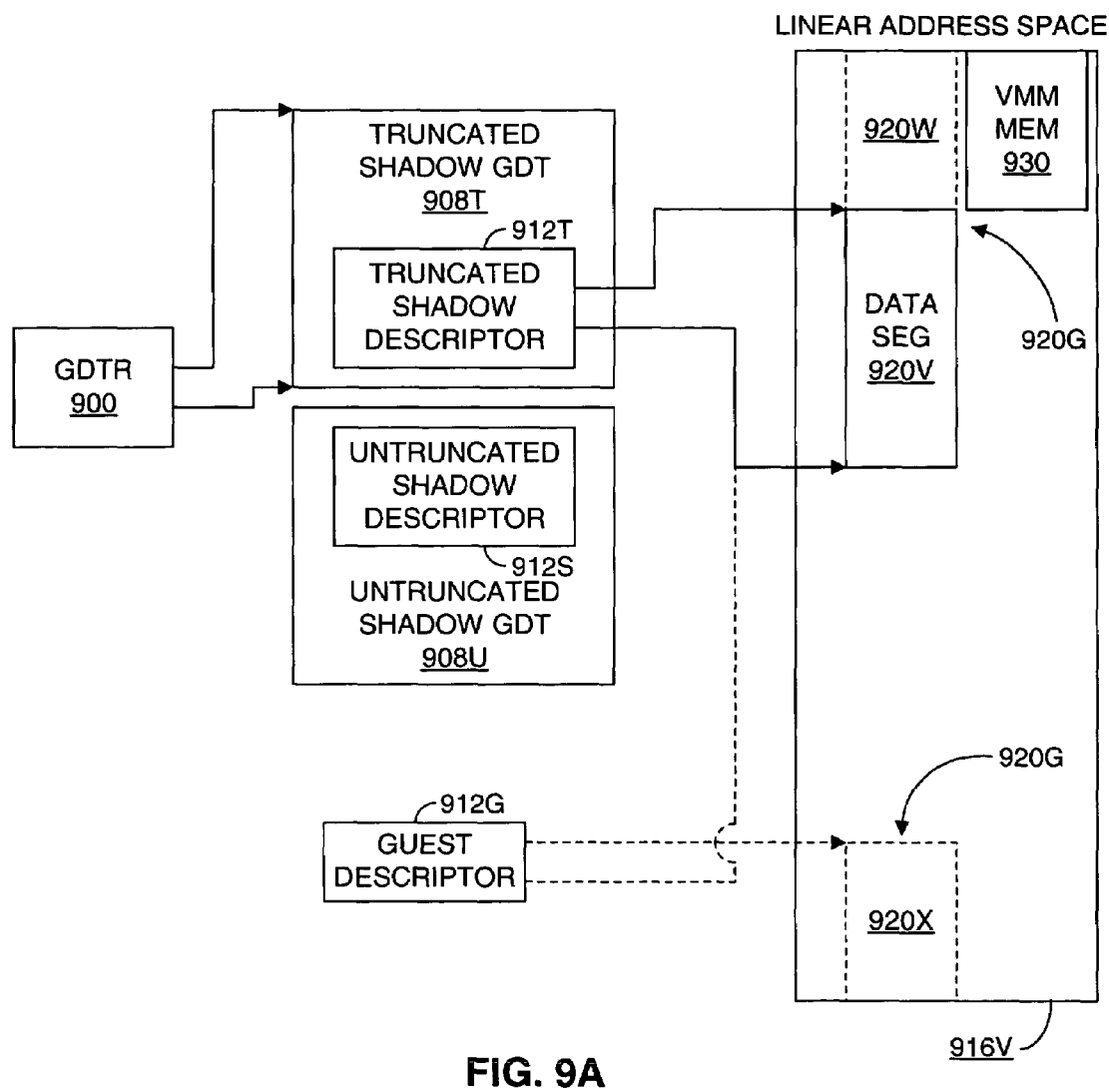
FIG. 9A illustrates a segment descriptor configuration for a first embodiment of the invention during binary translation.
Figure 9B:
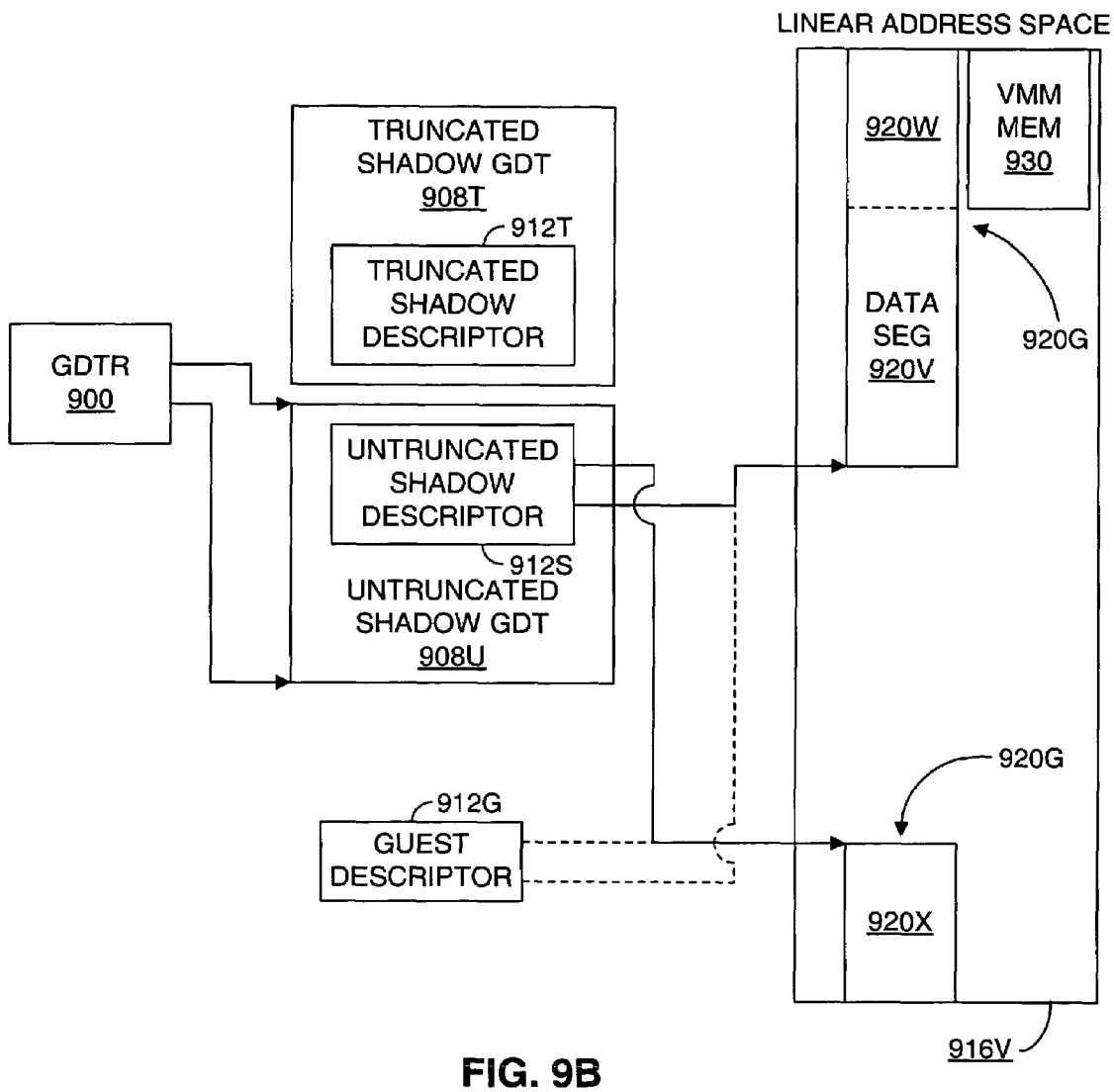
FIG. 9B illustrates a segment descriptor configuration for a first embodiment of the invention during direct execution.
Figure 10A:
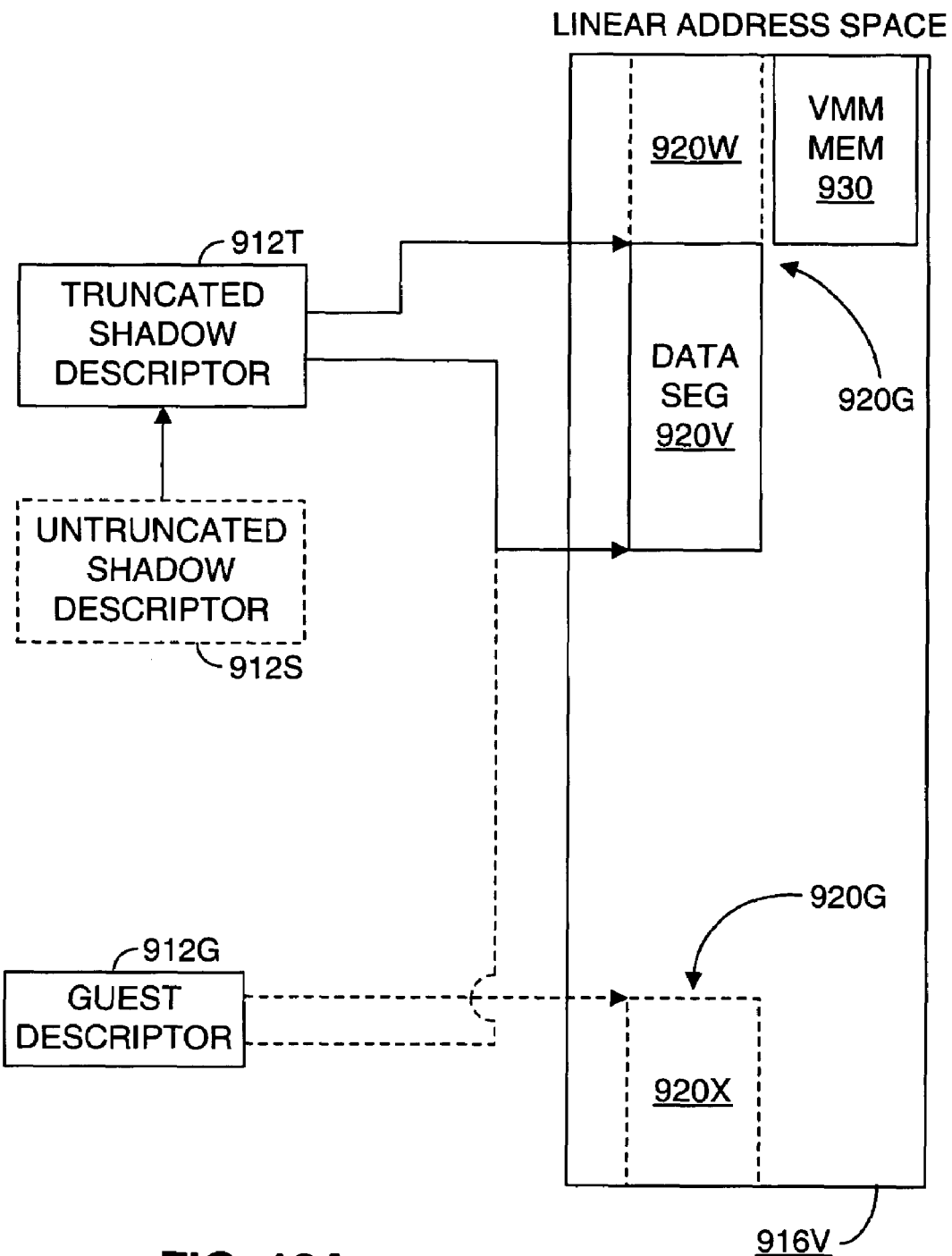
FIG. 10A illustrates a segment descriptor configuration for a second embodiment of the invention during binary translation.
Figure 10B:
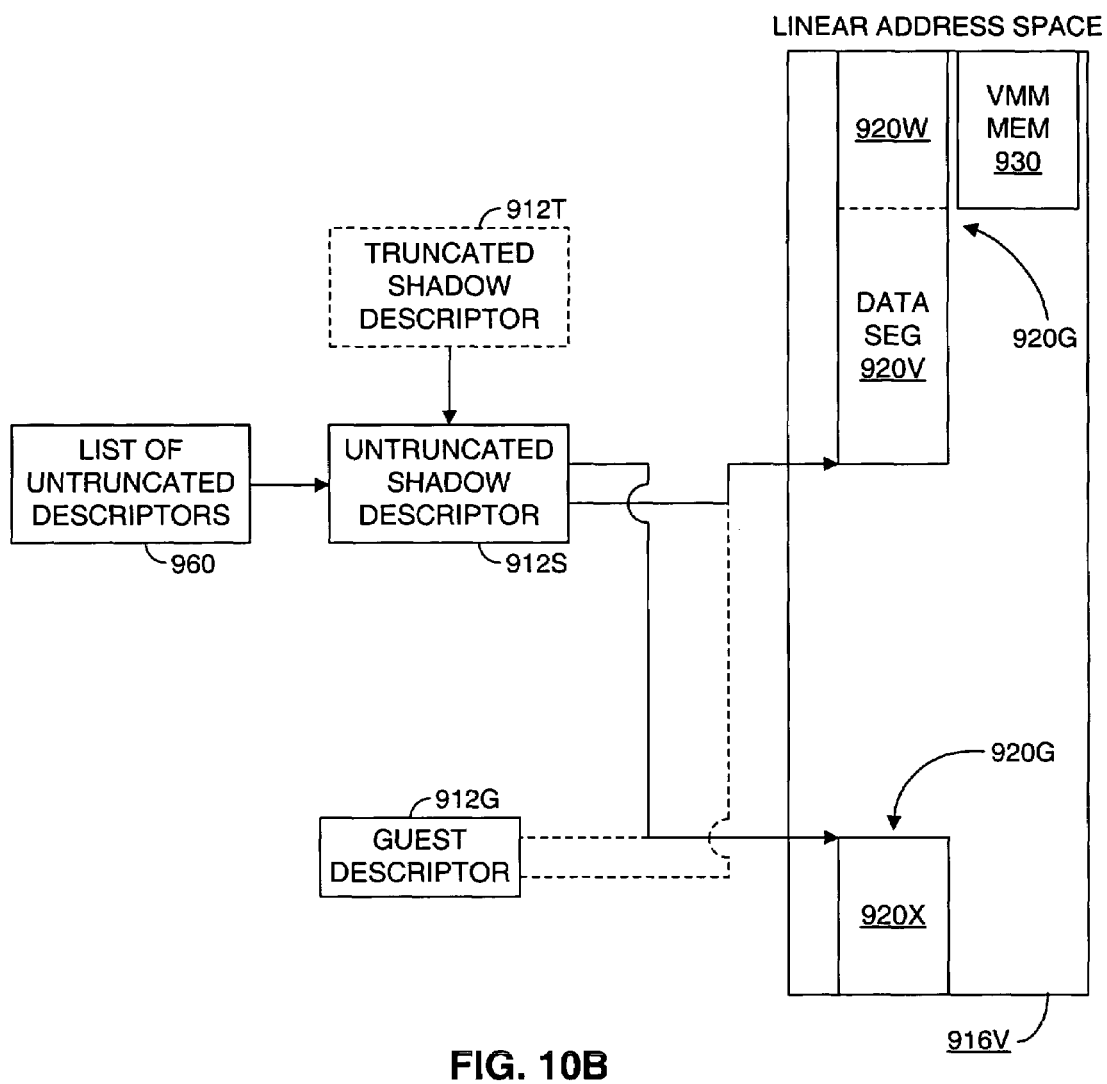
FIG. 10B illustrates a segment descriptor configuration for a second embodiment of the invention during direct execution.
Figure 11A:
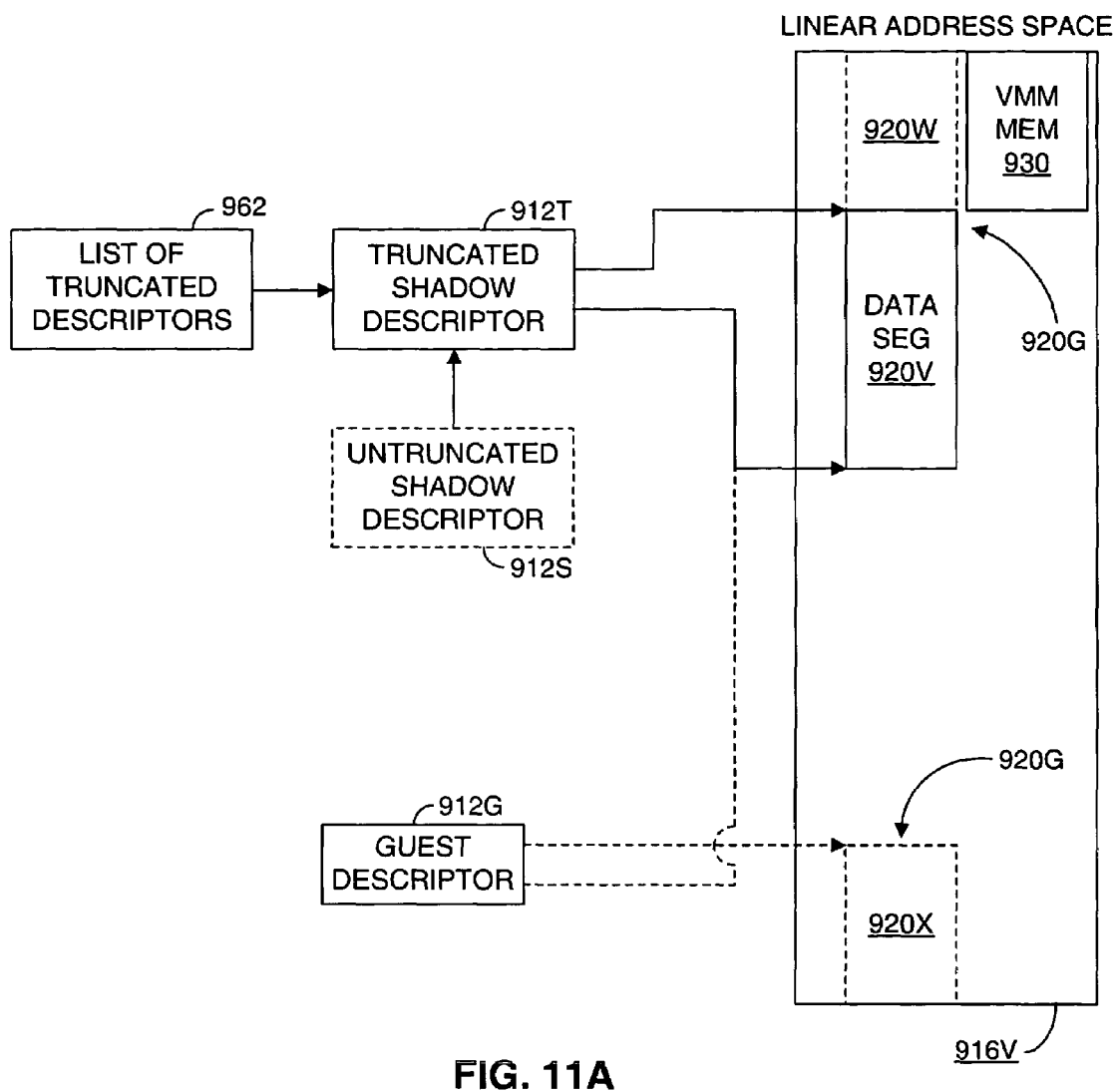
FIG. 11A illustrates a segment descriptor configuration for a third embodiment of the invention during binary translation.
Figure 11B:
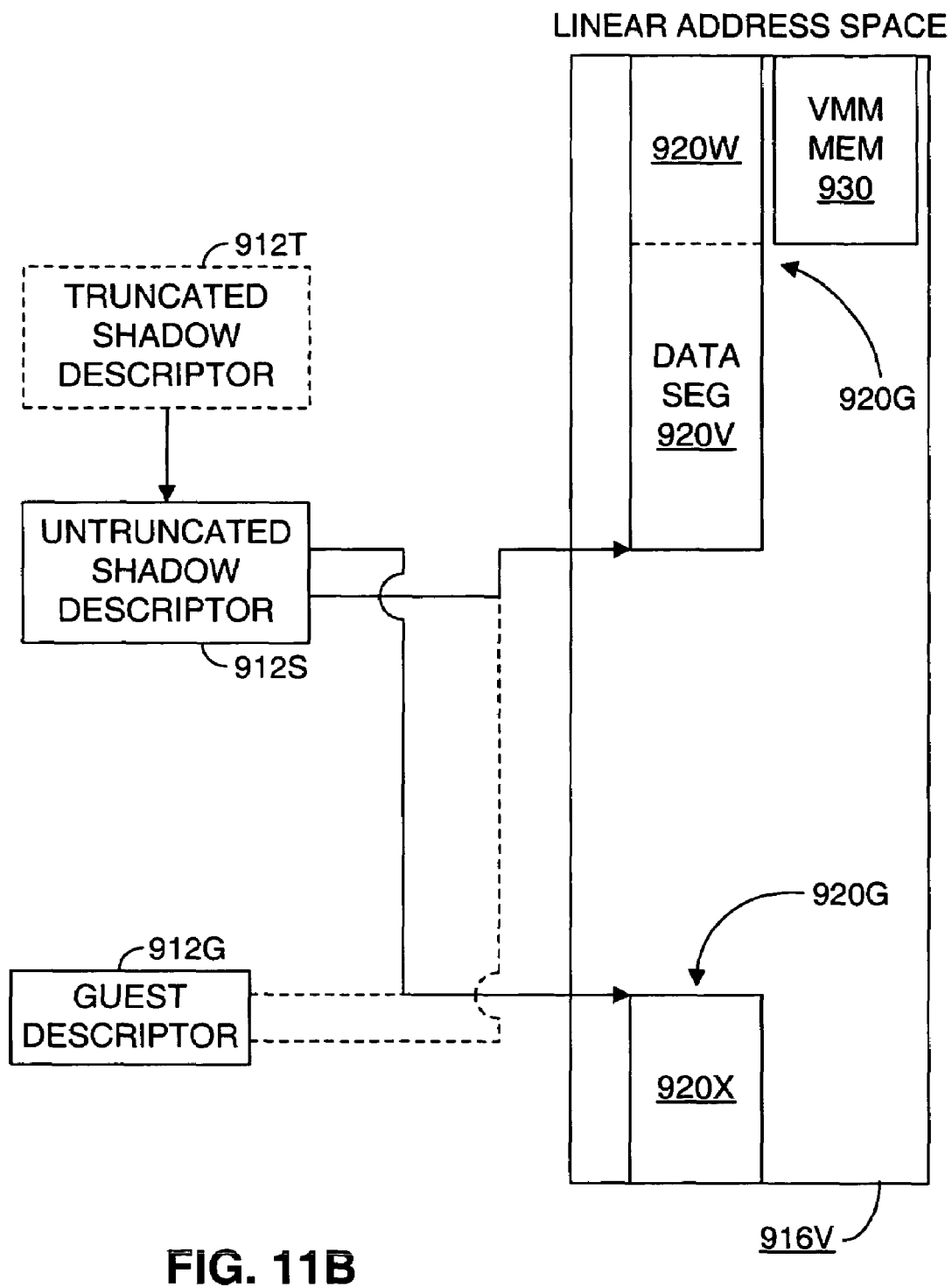
FIG. 11B illustrates a segment descriptor configuration for a third embodiment of the invention during direct execution.

FIGS. 9A and 9B illustrate a first embodiment of this invention, implementing a "two shadows" approach; FIGS. 10A and 10B illustrate a second embodiment of this invention, implementing a "lazy detruncation" approach; and FIGS. 11A and 11B illustrate a third embodiment of this invention, implementing a "lazy truncation" approach. A fourth embodiment of this invention, implementing a "lazy detruncation and lazy truncation" approach is not illustrated separately, although all of the concepts of the embodiment are illustrated in FIGS. 10A, 10B, 11A and 11B. Each of these four embodiments uses a different strategy for activating and deactivating the segmented memory protection mechanism. Various other strategies for completely or partially activating and deactivating the protection mechanism are also possible.

After the step 970, the method of FIG. 8 follows a path 478 and control is transferred to the DE unit 460 to begin directly executing guest instructions on the system hardware 100. The direct execution of guest instructions will continue until some event occurs that causes control to return to the VMM 400, such as a fault. At such a point, the method of FIG. 8 follows a path 480 and control again switches to the special handler 466. The special handler 466 again generally emulates one or more guest instructions, and then the method of FIG. 8 follows the path 472 to the decision unit 468. The decision unit 468 determines whether to return control to the DE unit 460 or to transfer control to the BT unit 462. If a decision is made to return to directly executing guest instructions, the method of FIG. 8 follows a path 482 to return control to the DE unit 460.

Suppose, for example, that the DE unit 460 is active and a guest access causes the memory paging protection mechanism to generate a page fault. The path 480 is followed and control transfers to the special handler 466. The special handler 466 then emulates the instruction that gave rise to the fault, accessing the physical memory location that contains the required guest data. Next, the method follows the path 472 to the decision unit 468. If the decision unit 468 determines that the DE unit 460 may resume operation, then the method of FIG. 8 follows the path 482 back to the DE unit 460.

At some point, the decision unit 468 will determine that the VMM 400 cannot continue to directly execute guest instructions on the system hardware 100. At this point, the method of FIG. 8 follows a path 484 to a step 974. The step 974 comprises one or more steps that may be performed when transitioning from direct execution mode to binary translation mode. One such step, under this invention, is illustrated in FIG. 8 as a step 974A. At the step 974A, the segmented memory protection mechanism may be activated to some extent, depending on the particular embodiment and the extent to which the protection mechanism was deactivated during the optional step 970A. If the mechanism was not deactivated during the step 970A, then no action needs to be taken during the step 974A. If, on the other hand, the mechanism was partially or completely deactivated during the step 970A, then it is generally reactivated during the step 974A. For example, if some truncated memory segments were detruncated during the step 970A, then those memory segments may be truncated again at the step 974A, depending on the particular embodiment.

The step 974A, like the step 970A, is also optional to some degree. However, the step is drawn with a solid line, indicating that the step is not completely optional, to emphasize that the step is not optional to the same degree as the step 970A. The step 974A is optional in the sense that not all shadow descriptors need be truncated at all times during binary translation, even for those shadow descriptors for which the corresponding guest memory segments extend into the address region that is occupied by the VMM 400. One embodiment described below, for example, allows the VMM 400 to maintain the shadow GDT 908S so that some of the shadow descriptors define guest memory segments that extend into the address region occupied by the VMM 400 even during the execution of binary translated instructions. However, the step 974A is not optional in the sense that, while binary translated instructions are being executed, any guest memory segment that is active, meaning that its shadow descriptor is loaded into a segment register, must generally be truncated, if necessary, so that the guest memory segment does not extend into the address region occupied by the VMM 400. After the step 974, the method of FIG. 8 follows a path 486 and control returns to the BT unit 462.

As indicated above, FIGS. 9A and 9B illustrate a first embodiment of this invention, which implements a two shadows approach to activating and deactivating the segmented memory protection mechanism. FIGS. 9A and 9B illustrate some of the same items that are shown in FIGS. 5A and 6, while other items shown in FIG. 5A and/or FIG. 6 are not illustrated in FIGS. 9A and 9B for simplicity. Specifically, FIGS. 9A and 9B illustrate the linear address space 916V, including the VMM memory 930 and the guest data segment 920G, which comprises the first data segment portion 920V, the second data segment portion 920W and the third data segment portion 920X. FIGS. 9A and 9B also show the guest data descriptor 912G, which defines the guest data segment 920G. The guest data descriptor 912G is stored in the guest GDT 908G (not shown in FIGS. 9A and 9B for simplicity).

FIGS. 9A and 9B also show a truncated shadow GDT 908T and an untruncated shadow GDT 908U. The truncated shadow GDT 908T is substantially the same as the shadow GDT 908S described above and illustrated in FIGS. 5A and 6, with all shadow descriptors truncated, as necessary, so that the corresponding memory segments do not extend into the address range that is occupied by the VMM 400. Thus, for example, the truncated shadow GDT 908T contains the same truncated shadow descriptor 912T as described above and shown in FIGS. 5A and 6, which corresponds to the guest data descriptor 912G. Thus, the truncated shadow descriptor 912T has a base address at the bottom of the first data segment portion 920V and a limit at the top of the first data segment portion 920V, so that the truncated data segment includes only the first data segment portion 920V and not the second data segment portion 920W or the third data segment portion 920X.

The untruncated shadow GDT 908U is substantially the same as the truncated shadow GDT 908T, except that none of the shadow descriptors are truncated, even if the corresponding memory segments extend into the address range of the VMM memory 930. Thus, for example, the untruncated shadow GDT 908U includes an untruncated shadow descriptor 912S that also corresponds with the guest descriptor 912G. The untruncated shadow descriptor 912S may be the same as the truncated shadow descriptor 912T, except that the limit of the untruncated descriptor is the same as the limit of the guest data descriptor 912G. Thus, the untruncated shadow descriptor 912S has a base address at the bottom of the first data segment portion 920V and a limit at the top of the third data segment portion 920X. The untruncated memory segment defined by the untruncated shadow descriptor 912S covers the same range of linear addresses as the guest memory segment 920G, including the first data segment portion 920V, the second data segment portion 920W and the third data segment portion 920X. Despite the fact that the untruncated memory segment defined by the untruncated shadow descriptor 912S covers the same range of addresses as the guest memory segment 920G, the untruncated shadow descriptor 912S may not be the same as the guest data descriptor 912G because, as described above, other modifications may also be made in generating a shadow descriptor from a guest descriptor, such as a possible change to the DPL.

FIGS. 9A and 9B also show the GDTR 900, which is used to select an active GDT. Thus, the GDTR 900 may be loaded with a base address and a limit that correspond with the truncated shadow GDT 908T to activate that GDT, or the GDTR may be loaded with a base address and a limit that correspond with the untruncated shadow GDT 908U to activate that GDT. When the truncated shadow GDT 908T is active, the segmented memory protection mechanism is completely activated, because all the shadow descriptors in the GDT are truncated, as needed, to protect the VMM memory 930. When the untruncated shadow GDT 908U is active, the segmented memory protection mechanism is completely deactivated, because none of the shadow descriptors in the GDT are truncated.

FIG. 9A shows the configuration of the GDTR 900 when the VMM 400 is in the binary translation mode, namely with the GDTR containing a base address and a limit that correspond with the truncated shadow GDT 908T. Thus, when the VMM 400 is in the binary translation mode, the segmented memory protection mechanism is active to protect the VMM memory 930, as described above. For example, the truncated shadow descriptor 912T is used instead of the untruncated shadow descriptor 912S so that the corresponding truncated memory segment includes only the first data segment portion 920V.

FIG. 9B shows the configuration of the GDTR 900 when the VMM 400 is in the direct execution mode, namely with the GDTR containing a base address and a limit that correspond with the untruncated shadow GDT 908U. Thus, when the VMM 400 is in the direct execution mode, the segmented memory protection mechanism is not active, and the VMM 400 must rely on the memory paging protection mechanism to protect the VMM memory 930, as also described above. For example, the untruncated shadow descriptor 912S is used instead of the truncated shadow descriptor 912T so that the corresponding untruncated memory segment includes the first data segment portion 920V, the second data segment portion 920W and the third data segment portion 920X.

Referring again to FIG. 8, when making a transition from the direct execution mode to the binary translation mode for this two shadows embodiment, at the step 974A, the GDTR 900 is loaded with a base address and a limit that correspond with the truncated shadow GDT 908T so that the segmented memory protection mechanism is activated. In addition, all segment registers are reloaded (or at least those segment registers that contain shadow descriptors), after the GDTR is loaded, so that any untruncated shadow descriptors from the untruncated shadow GDT 908U are replaced with truncated shadow descriptors from the truncated shadow GDT 908T before the execution of binary translated code begins.

Still referring to FIG. 8, when making a transition from the binary translation mode to the direct execution mode for this two shadows embodiment, at the step 970A, the GDTR 900 is loaded with a base address and a limit that correspond with the untruncated shadow GDT 908U so that the segmented memory protection mechanism is deactivated. In addition, all segment registers are reloaded (or at least those segment registers that contain shadow descriptors), after the GDTR is loaded, so that any truncated shadow descriptors from the truncated shadow GDT 908T are replaced with untruncated shadow descriptors from the untruncated shadow GDT 908U before the direct execution of guest instructions begins.

This two shadows embodiment of the invention is advantageous in that the segmented memory protection mechanism will not unnecessarily block any guest accesses during direct execution, even for guest memory segments that wrap around the top of the linear address space 916V, because the protection mechanism is completely deactivated.

This embodiment also has another advantage over the protection mechanism implemented in the existing VMware products described above. In those products, an LSL (Load Segment Limit) instruction that is executed during direct execution may not return the value that is expected by guest software. The LSL instruction, which is described in detail in the IA-32 Manual, loads the limit of a selected segment descriptor into a general-purpose register. If the VMM 400 has truncated a guest segment descriptor for which the LSL instruction is executed during direct execution, the LSL instruction will return the limit of the truncated shadow descriptor, instead of the limit of the guest descriptor. In contrast, in this embodiment of the invention, the LSL instruction would return the guest limit in this situation because the untruncated shadow descriptor would be used during direct execution. When the VMM 400 is in the binary translation mode, the truncated shadow descriptors will be used, but the LSL instruction can be translated to a set of instructions that returns the corresponding limit for the guest descriptor, instead of the shadow descriptor.

This two shadows embodiment also has some disadvantages in comparison to other possible embodiments. First, the performance of a virtual computer system implementing the first embodiment may suffer because every time the VMM 400 switches between binary translation and direct execution, the GDT tables and the LDT tables must be switched. As described above, the descriptions in this patent apply to LDTs and the LDTR as much as they apply to the GDTs and the GDTR, although the description is generally limited to the GDTs and the GDTR for simplicity. Also, in comparison to other possible embodiments, the first embodiment generally uses more memory to implement the segmented memory protection mechanism because it maintains both truncated and untruncated versions of both the GDTs and the LDTs.

FIGS. 10A and 10B illustrate a second embodiment of this invention, which implements a lazy detruncation approach to activating and deactivating the segmented memory protection mechanism. FIGS. 10A and 10B also illustrate some of the same items that are shown in FIGS. 5A and 6, while other items shown in FIG. 5A and/or FIG. 6 are not illustrated in FIGS. 10A and 10B for simplicity. Specifically, FIGS. 10A and 10B illustrate the linear address space 916V, including the VMM memory 930 and the guest data segment 920G, which comprises the first data segment portion 920V, the second data segment portion 920W and the third data segment portion 920X. FIGS. 10A and 10B also show the guest data descriptor 912G, which defines the guest data segment 920G. The guest data descriptor 912G is stored in the guest GDT 908G (not shown in FIGS. 10A and 10B for simplicity).

FIGS. 10A and 10B also show a truncated shadow descriptor 912T and an untruncated shadow descriptor 912S. Unlike the two shadows embodiment of FIGS. 9A and 9B, the truncated shadow descriptor 912T and the untruncated shadow descriptor 912S are not actually distinct shadow descriptors. Instead, the truncated shadow descriptor 912T may be detruncated to produce the untruncated shadow descriptor 912S, and the untruncated shadow descriptor 912S may be truncated to produce the truncated shadow descriptor 912T. In other words, the truncated shadow descriptor 912T and the untruncated shadow descriptor 912S are the same shadow descriptor, with the different labels indicating whether that one shadow descriptor is currently truncated. The one shadow descriptor that embodies either the truncated shadow descriptor 912T or the untruncated shadow descriptor 912S corresponds to the guest data descriptor 912G, and it is stored in the shadow GDT 908S (not shown in FIGS. 10A and 10B for simplicity). The GDTR 900 (also not shown in FIGS. 10A and 10B for simplicity) contains a base address and a limit that correspond with the shadow GDT 908S to activate that GDT.

As shown in FIGS. 10A and 10B, the guest data descriptor 912G has a base address at the bottom of the first data segment portion 920V and a limit at the top of the third data segment portion 920X, defining the guest data segment 920G. As shown in FIG. 10A, the truncated shadow descriptor 912T has the same base address as the guest data descriptor 912G and a limit at the top of the first data segment portion 920V, defining a truncated data segment including only the first data segment portion 920V. As shown in FIG. 10B, the untruncated shadow descriptor 912S has the same base address and the same limit as the guest data descriptor 912G, defining an untruncated data segment including the same three data segment portions 920V, 920W and 920X the guest data segment 920G.

This second embodiment of the invention involves "lazily" detruncating shadow descriptors to partially deactivate the segmented memory protection mechanism. When the VMM 400 is executing binary translated instructions, all of the shadow descriptors in the shadow GDT 908S are truncated, as necessary, to protect the VMM memory 930. FIG. 10A illustrates the configuration of the segmented memory protection mechanism during binary translation. The truncated shadow descriptor 912T defines a truncated data segment that includes only the first data segment portion 920V.

Referring again to FIG. 8, at the step 970A, nothing needs to be done with respect to the segmented memory protection mechanism when making a transition from the binary translation mode to the direct execution mode for this second embodiment. The segmented memory protection mechanism remains completely active when the VMM 400 begins directly executing guest instructions.

Now, if a general protection fault occurs during direct execution, it may be an unnecessary fault, resulting from a guest access that was unnecessarily blocked by the segmented memory protection mechanism. For example, suppose the guest software attempts a guest access to a memory location in the guest data segment 920G that falls within the third data segment portion 920X. This guest access is blocked because the memory location falls outside of the truncated memory segment defined by the truncated shadow descriptor 912T, even though the guest access poses no risk to the VMM memory 930.

When a general protection fault occurs during direct execution, the VMM 400 makes some attempt to determine whether the fault was unnecessarily generated by the segmented memory protection mechanism due to this inefficiency of the mechanism. The sophistication of this attempt may vary in different embodiments or in different situations. In one embodiment, for example, the VMM 400 assumes that any general protection fault that occurs during direct execution is caused by this inefficiency if there are any truncated shadow descriptors loaded into any of the segment registers. If there are any such truncated shadow descriptors, then the VMM 400 detruncates all such truncated shadow descriptors that are loaded into the segment registers, and then the VMM reloads the segment registers. Next, the VMM 400 restarts the instruction that gave rise to the fault. If the fault was unnecessarily generated by the segmented memory protection mechanism, then the instruction should complete successfully the next time. The VMM 400 also maintains a list of all shadow descriptors that have been detruncated in this manner. This list may also include shadow descriptors that never need to be truncated because the corresponding memory segments do not extend into the VMM memory 930. In this case, the list of shadow descriptors may be characterized as a list of untruncated shadow descriptors.

If there are no truncated shadow descriptors loaded into any of the segment registers when a general protection fault occurs, then the fault was not generated unnecessarily by the segmented memory protection mechanism, and some other error handling routine of the VMM 400 is invoked. The VMM 400 can determine whether there are any truncated shadow descriptors loaded into any of the segment registers by determining whether any shadow descriptors that are loaded into the segment registers do not appear in the list of untruncated shadow descriptors.

As an example of detruncating shadow descriptors under this embodiment, suppose the truncated shadow descriptor 912T is loaded into a segment register when a general protection fault occurs during direct execution. The VMM 400 detruncates the truncated shadow descriptor 912T to produce the untruncated shadow descriptor 912S, as illustrated in FIG. 10B. The VMM 400 also loads the same segment register with the untruncated shadow descriptor 912S to activate the untruncated data segment that includes the three data segment portions 920V, 920W and 920X. The VMM 400 also adds the untruncated shadow descriptor 912S to a list of untruncated descriptors 960, as also shown in FIG. 10B. From this point forward during this pass of direct execution, the shadow descriptors that have been detruncated in this manner will no longer cause any unnecessary general protection faults.

When the VMM 400 switches back to binary translation, from direct execution, at the step 974A of FIG. 8, the VMM 400 reads the list of untruncated descriptors 960 to determine which shadow descriptors have been detruncated (or were already untruncated) during this last pass of direct execution. The VMM 400 then truncates all of these untruncated shadow descriptors, as necessary, and reloads the segment registers. Thus, as shown in FIG. 10A, the VMM 400 truncates the untruncated shadow descriptor 912S to produce the truncated shadow descriptor 912T. Thus, again, all shadow descriptors are truncated, as necessary, to protect the VMM memory 930, so that the segmented memory protection mechanism is completely activated before the VMM 400 returns to executing binary translated instructions.

With this lazy detruncation embodiment, some shadow memory segments may be truncated during the direct execution of guest instructions. As a result, the execution of an LSL instruction during direct execution may not return the value that is expected by guest software, just like with the VMware products described above. In that sense, this second embodiment is not as advantageous as the first embodiment.

On the other hand, this lazy detruncation embodiment may be more efficient than the two shadows embodiment when the VMM 400 switches between binary translation and direct execution. There is generally no need to switch GDT tables or LDT tables. Also, shadow descriptors are only detruncated and then retruncated if these actions are likely to reduce the number of unnecessary general protection faults, although there will be some overhead added in responding to a general protection fault after a first access that requires a shadow descriptor to be detruncated. Also, the lazy detruncation embodiment does not require the additional memory required under the two shadows embodiment to maintain both truncated and untruncated versions of the GDTs and LDTs.

FIGS. 11A and 11B illustrate a third embodiment of this invention, which implements a lazy truncation approach to activating and deactivating the segmented memory protection mechanism. FIGS. 11A and 11B also illustrate some of the same items that are shown in FIGS. 5A and 6, while other items shown in FIG. 5A and/or FIG. 6 are not illustrated in FIGS. 11A and 11B for simplicity. Specifically, FIGS. 11A and 11B illustrate the linear address space 916V, including the VMM memory 930 and the guest data segment 920G, which comprises the first data segment portion 920V, the second data segment portion 920W and the third data segment portion 920X. FIGS. 11A and 11B also show the guest data descriptor 912G, which defines the guest data segment 920G. The guest data descriptor 912G is stored in the guest GDT 908G (not shown in FIGS. 11A and 11B for simplicity).

FIGS. 11A and 11B also show a truncated shadow descriptor 912T and an untruncated shadow descriptor 912S. Like the lazy detruncation embodiment of FIGS. 10A and 10B, the truncated shadow descriptor 912T and the untruncated shadow descriptor 912S are actually the same shadow descriptor, with the different labels indicating whether that one shadow descriptor is currently truncated. Thus, the truncated shadow descriptor 912T may be detruncated to produce the untruncated shadow descriptor 912S, and the untruncated shadow descriptor 912S may be truncated to produce the truncated shadow descriptor 912T. The one shadow descriptor that embodies either the truncated shadow descriptor 912T or the untruncated shadow descriptor 912S corresponds to the guest data descriptor 912G, and it is stored in the shadow GDT 908S (not shown in FIGS. 11A and 11B for simplicity). The GDTR 900 (also not shown in FIGS. 11A and 11B for simplicity) contains a base address and a limit that correspond with the shadow GDT 908S to activate that GDT.

As shown in FIGS. 11A and 11B, the guest data descriptor 912G has a base address at the bottom of the first data segment portion 920V and a limit at the top of the third data segment portion 920X, defining the guest data segment 920G. As shown in FIG. 11A, the truncated shadow descriptor 912T has the same base address as the guest data descriptor 912G and a limit at the top of the first data segment portion 920V, defining a truncated data segment including only the first data segment portion 920V. As shown in FIG. 11B, the untruncated shadow descriptor 912S has the same base address and the same limit as the guest data descriptor 912G, defining an untruncated data segment including the same three data segment portions 920V, 920W and 920X as the guest data segment 920G.

This third embodiment of the invention involves "lazily" truncating shadow descriptors to activate the segmented memory protection mechanism only as needed. When the VMM 400 is directly executing guest instructions, all of the shadow descriptors in the shadow GDT 908S are untruncated. FIG. 11B illustrates the configuration of the segmented memory protection mechanism during direct execution. The untruncated shadow descriptor 912S defines an untruncated data segment that includes the three data segment portions 920V, 920W and 920X.

Referring again to FIG. 8, at the step 974A, not all shadow descriptors need to be truncated when making a transition from the direct execution mode to the binary translation mode for this lazy truncation embodiment. The segmented memory protection mechanism may remain partially deactivated when the VMM 400 begins executing binary translated instructions. During binary translation, however, the VMM 400 ensures that any shadow descriptor that is loaded into a segment register is truncated, as needed. First, at the step 974A of FIG. 8, when making a transition from the direct execution mode to the binary translation mode, the VMM 400 truncates any shadow descriptors that are loaded into a segment register, as needed, and then reloads the corresponding segment registers with the newly truncated shadow descriptors.

Then, after the binary translation mode has begun, when the translator 461 (see FIG. 8) encounters a guest instruction that loads a shadow descriptor into a segment register, the translator 461 generates translated code that handles the loading of the segment register in a special manner. The translated code first checks to see if the shadow descriptor has been truncated and, if not, the translated code truncates the shadow descriptor, as needed. The translated code then completes the loading of the segment register using the truncated shadow descriptor. Thus, if a guest instruction would load the untruncated shadow descriptor 912S into a segment register, the corresponding translated code would first truncate the untruncated shadow descriptor 912S to produce the truncated shadow descriptor 912T, as shown in FIG. 11A, and then load the truncated shadow descriptor 912T into the segment register. Thus, before a guest access can be made to the untruncated shadow descriptor 912S during binary translation, which could pose a risk to the VMM memory 930, the shadow descriptor is truncated, if necessary, to protect the VMM memory 930. Also, as shown in FIG. 11A, the VMM 400 maintains a list of truncated descriptors 962 that keeps track of all shadow descriptors that have been truncated in this manner.

When the VMM 400 switches back to direct execution, from binary translation, at the step 970A of FIG. 8, the VMM 400 reads the list of truncated descriptors 962 to determine which shadow descriptors have been truncated during this last pass of binary translation. The VMM 400 then detruncates all of these truncated shadow descriptors and reloads the segment registers. Thus, as shown in FIG. 11B, the VMM 400 detruncates the truncated shadow descriptor 912T to produce the untruncated shadow descriptor 912S. Thus, all shadow descriptors are untruncated again before direct execution begins, so that the segmented memory protection mechanism is completely deactivated.

This lazy truncation embodiment, like the two shadows embodiment, can execute an LSL instruction in either direct execution or binary translation and return the value that is expected by guest software, because the limits for all shadow descriptors during direct execution are the same as for the corresponding guest descriptors. This lazy truncation embodiment is also advantageous, like the lazy detruncation embodiment, in that the VMM 400 is able to efficiently switch between binary translation and direct execution, without having to switch GDT tables or LDT tables. Also, shadow descriptors are only truncated and then detruncated if necessary to protect the VMM memory 930. Also, the lazy truncation embodiment does not require the additional memory required under the two shadows embodiment to maintain both truncated and untruncated versions of the GDTs and LDTs.

One disadvantage of the lazy truncation embodiment, however, in comparison to the two shadows embodiment and the lazy detruncation embodiment, is that the lazy truncation embodiment adds overhead every time a segment register is loaded with a shadow descriptor during binary translation.

A fourth embodiment of this invention implements a lazy detruncation and lazy truncation approach to activating and deactivating the segmented memory protection mechanism. The fourth embodiment is not illustrated separately, because all of the concepts of the embodiment are already illustrated in FIGS. 10A, 10B, 11A and 11B. This fourth embodiment of the invention involves lazily detruncating shadow descriptors during direct execution to partially deactivate the segmented memory protection mechanism and lazily truncating shadow descriptors during binary translation to activate the segmented memory protection mechanism only as needed.

When making a transition from the binary translation mode to the direct execution mode, at the step 970A of FIG. 8, nothing needs to be done with respect to the segmented memory protection mechanism. The segmented memory protection mechanism may be partially or completely active when the VMM 400 begins directly executing guest instructions. During direct execution, the VMM 400 responds to a general protection fault in the same manner as described above for the lazy detruncation embodiment. Thus, in one particular embodiment, the VMM 400 responds to a general protection fault by detruncating any truncated shadow descriptors that are loaded into the segment registers, and then the VMM reloads the segment registers, before restarting the instruction that gave rise to the fault. If there are no truncated shadow descriptors loaded into any of the segment registers, then the VMM 400 invokes some other error handling routine in response to the general protection fault. The VMM 400 may also maintain a list of all shadow descriptors that have been detruncated in this manner, along with shadow descriptors that never need to be truncated because their memory segments do not extend into the VMM memory 930.

When making a transition from the direct execution mode to the binary translation mode in this lazy detruncation and lazy truncation embodiment, at the step 974A of FIG. 8, not all shadow descriptors need to be truncated again, just like under the lazy truncation embodiment. The segmented memory protection mechanism may remain partially deactivated when the VMM 400 begins executing binary translated instructions. During binary translation, however, the VMM 400 again ensures that any shadow descriptor that is loaded into a segment register is truncated, as needed. First, at the step 974A of FIG. 8, when making a transition from the direct execution mode to the binary translation mode, the VMM 400 truncates any shadow descriptors that are loaded into a segment register, as needed, and then reloads the corresponding segment registers with the newly truncated shadow descriptors.

Then, after the binary translation mode has begun, when the translator 461 (see FIG. 8) encounters a guest instruction that loads a shadow descriptor into a segment register, the translator 461 generates translated code that handles the loading of the segment register in a special manner. The translated code first checks to see if the shadow descriptor has been truncated and, if not, the translated code truncates the shadow descriptor, as needed. The translated code then completes the loading of the segment register using the truncated shadow descriptor. Also, the VMM 400 may maintain a list of truncated descriptors that keeps track of all shadow descriptors that have been truncated in this manner.

With this lazy detruncation and lazy truncation embodiment, some shadow memory segments may be truncated during the direct execution of guest instructions, so, like the lazy detruncation embodiment, the execution of an LSL instruction during direct execution may not return the value that is expected by guest software. Also, like the lazy truncation embodiment, this embodiment adds overhead every time a segment register is loaded with a shadow descriptor during binary translation. And, like with the lazy detruncation embodiment, this embodiment adds some overhead when responding to a general protection fault after a first access that requires a shadow descriptor to be detruncated.

This fourth embodiment also has significant advantages over the other embodiments, though. First, this embodiment is likely to be efficient both in switching from direct execution to binary translation and in switching from binary translation to direct execution. Also, this embodiment may be more efficient overall because shadow descriptors are only truncated when necessary and they are only detruncated when it is likely to reduce the number of unnecessary general protection faults. Finally, this lazy detruncation and lazy truncation embodiment also does not require the additional memory required under the two shadows embodiment to maintain both truncated and untruncated versions of the GDTs and LDTs.

The invention has been described in terms of a virtual computer system based on the x86 architecture, in which a VMM supports a VM, and the VMM transparently, but safely occupies a portion of the address space of a guest, which improves the performance of the virtual computer system. In the described embodiment, the VMM sometimes operates in a direct execution mode and other times in a binary translation mode. During binary translation a segmented memory protection mechanism is used to protect the VMM memory from guest software, while, during direct execution, a memory paging protection mechanism is used to protect the VMM memory. Depending on the particular embodiment, the segmented memory protection mechanism may also be partially or completely active at times during direct execution.

In the described embodiments, the segmented memory mechanism is advantageous during binary translation because, as described above, individual instructions may be either permitted to use the VMM memory or prevented from using the VMM memory, without having to change privilege levels or address spaces, allowing access to both guest memory and VMM memory. For memory segments that wrap around the top of the linear address space, however, the segmented memory mechanism may unnecessarily block guest accesses to memory locations that pose no risk to the VMM memory, as described above, resulting in unnecessary delays in the execution of instructions. In contrast, the memory paging mechanism may be implemented with a granularity of a single page, so that the unnecessary blocking of guest accesses can be substantially eliminated. Also, during direct execution, there is no need to access VMM memory, so the main advantages of the segmented memory mechanism are of no benefit. Thus, the virtual computer system may be made more efficient by deactivating the segmented memory mechanism during direct execution and relying on the memory paging mechanism.

In the embodiments described above, binary translation is always performed at a privileged level, at a CPL of 1. The memory paging mechanism, meanwhile, only blocks attempted memory accesses from code that is executed at the user privilege level. As a result, the memory paging mechanism has no effect during binary translation. Thus, in the embodiments described above, the memory paging mechanism does not need to be deactivated during binary translation. Also because the memory paging mechanism has no effect during binary translation, the segmented memory mechanism must be activated during binary translation, at least to an extent required to protect the VMM memory. Also, during direct execution, the segmented memory mechanism does not need to be deactivated, because the mechanism does not cause any instructions to be executed improperly; it simply unnecessarily delays the execution of some instructions. Thus, in the embodiments described above, the memory paging mechanism can always remain active, and the segmented memory mechanism may be optionally deactivated during direct execution to improve the speed of execution of the virtual computer system. As described above, in these embodiments, the segmented memory mechanism may be partially or completely activated by using truncated memory segments that protect the VMM memory, and the mechanism may be deactivated by using untruncated memory segments.

Thus far, this patent has described four different embodiments, which use different techniques for switching between truncated memory segments and untruncated memory segments. In the first embodiment, referred to as the two shadows embodiment, separate descriptor tables are maintained for containing truncated and untruncated segment descriptors and the different tables are activated to activate the truncated or untruncated memory segments. In the second embodiment, referred to as the lazy detruncation embodiment, all memory segments are truncated, as necessary, before entering binary translation, and memory segments are selectively detruncated during direct execution. In the third embodiment, referred to as the lazy truncation embodiment, all memory segments that have been truncated are detruncated before entering direct execution, and memory segments are selectively truncated just before they become active during binary translation. In the fourth embodiment, referred to as the lazy detruncation and lazy truncation embodiment, memory segments are selectively truncated just before they become active during binary translation, and memory segments are selectively detruncated during direct execution.

Thus, in all four embodiments, all memory segments that become active during binary translation are truncated, as necessary, at some point before they become active. In the third and fourth embodiments, the truncation occurs immediately before the memory segments become active during binary translation, while, in the first and second embodiments, the truncation occurs during the transition from direct execution to binary translation. Various other embodiments may truncate memory segments at other times, or based on other conditions, so long as the memory segments are truncated, as necessary, before they become active during binary translation. Memory segments that are truncated, as needed, before activation, but with varying truncation times or conditions, are referred to as "effectively truncated" memory segments. The segmented memory protection mechanism is "effectively activated" when all memory segments are effectively truncated regardless of whether they are all actually truncated. When all memory segments are actually truncated, as needed, then the segmented memory protection mechanism is "completely activated" and the memory segments, as a group, are "completely truncated." Thus, the segmented memory protection mechanism may be effectively activated even though there are some memory segments that are not tuncated that extend into the linear address region occupied by the VMM 400, so long as those untruncated memory segments are truncated, as needed, prior to their activation.

As described above, in earlier VMware products based on the x86 architecture, the BT unit 462 always executes as privileged code, at a CPL of 1. Also, the above description was directed toward implementations in which the BT unit executes only at a CPL of 1. However, in more recent VMware products, while the BT unit 462 still executes at a CPL of 1 most of the time, the BT unit 462 sometimes also executes at a CPL of 3. Thus, the following description now considers implementations in which the BT unit sometimes executes at a CPL of 3. These implementations can be assumed to operate in substantially the same manner as the implementations described above, except as described below. Thus, for example, the VMM memory 930 may again be placed in the upper-most portion of the linear address space 916V of the guest software, as illustrated in FIG. 5A.

As also described above, in implementations in which the BT unit 462 always executes at a CPL of 1, when switching to execute translated code that corresponds with guest code that executes at a CPL of 3, a separate user-level shadow page table is activated that only includes shadow PTEs for memory pages that are accessible with a user privilege level, and it does not include any shadow PTEs that correspond with guest PTEs that require a supervisor privilege level. Maintaining this separate shadow page table and switching between the two page tables is cumbersome and time consuming. More recent VMware products have begun to execute binary translated code at a CPL of 3 when the corresponding guest software executes at a CPL of 3 to eliminate the need for this separate shadow page table.

Now suppose one of the more recent VMware products is operating with the VMM 400 in binary translation mode. The binary translation mode is generally used for guest software that executes at a supervisor privilege level, while the direct execution mode is only used for guest software that executes at the user privilege level. However, in some situations, the BT unit 462 may be used for some guest software that executes at user level. Thus, suppose the BT unit 462 is executing translated code that corresponds to guest software that executes at a supervisor level, such as a CPL of 0. In this situation, the BT unit executes at a CPL of 1. In this situation, the VMM memory 930 is protected from guest accesses by the segmented memory protection mechanism in substantially the same manner as described above. Thus, the guest memory segments used during binary translation must be effectively truncated. As described above, the segmented memory protection mechanism enables some of the translated instructions to access VMM memory, while other translated instructions that include guest accesses are restricted from accessing VMM memory. Suppose also, for the moment, that the memory paging protection mechanism is currently active as described above. In this case, the memory paging protection mechanism would not block any guest accesses because the translated code is executing at a supervisor privilege level (CPL=1). This is appropriate because the corresponding guest software would also be executing at a supervisor level (CPL=0).

Now suppose the guest software that is "executing" in the VM 300, through the BT unit 462, returns from the supervisor code back to user-level code. Thus, the CPL of the virtual CPU 302 switches from a level of 0 to a level of 3. In the more recent VMware products, the CPL of the physical CPU 102 also switches from a level of 1 to a level of 3, while the VMM 400 is still operating in the binary translation mode. In this situation, there is no need to use a separate user-level shadow page table, as described above. The translated instructions are executing at the same privilege level as the corresponding guest software, so any guest accesses in the translated code will have the same page protection restrictions as in the actual guest software. The page protection restrictions set up by the guest OS 320 are adequate to protect supervisor level memory pages from the guest accesses from this user-level software.

As described above, and as illustrated in FIG. 7, the memory pages containing the VMM memory 930 are normally set to the supervisor privilege level. Also as described above, the execution of binary translated instructions requires access to both guest memory and to the VMM memory 930. However, because the binary translated code is now executing at a CPL of 3, the code would not be able to access the VMM memory having a supervisor privilege level. Consequently, when the BT unit 462 is executing at a CPL of 3, the memory pages for the VMM memory are changed to a user privilege level, so that the memory may be accessed by the translated code. More specifically, referring to FIG. 7, the PTEs in the shadow page table 413 corresponding to the memory pages in the linear address space 916V that are occupied by the VMM 400 are modified so that the user/supervisor flag is set to the user level, and the TLB 130 (see FIG. 3) is flushed. In effect, the memory paging protection mechanism has been deactivated, at least as it relates to the VMM memory 930, because it no longer prevents user-level guest accesses from reaching the VMM memory. The segmented memory protection mechanism still protects the VMM memory from guest accesses, however, as described above.

Now that the memory paging protection mechanism is being deactivated at times, the timing and conditions at which the segmented memory protection mechanism is partially or completely deactivated may also need to be adjusted. Each of the four embodiments described above, namely the two shadows embodiment, the lazy detruncation embodiment, the lazy truncation embodiment, and the lazy detruncation and lazy truncation embodiment, may also be implemented in the more recent VMware products, although some adjustments are either necessary or advantageous.

For example, the two shadows embodiment may be modified so that, if the memory paging protection mechanism is deactivated during binary translation, then, when transitioning back to the direct execution mode, the segmented memory protection mechanism may be left completely active by continuing to use the truncated shadow GDT 908T, instead of switching to the untruncated shadow GDT 908U as described above. The VMM 400 may switch back and forth between direct execution and binary translation multiple times with the segmented memory protection mechanism completely active and the memory paging protection mechanism completely inactive. At some point, the memory paging protection mechanism may be activated again by setting the user/supervisor flag to the supervisor level for the PTEs in the shadow page table 413 corresponding to the memory pages in the linear address space 916V that are occupied by the VMM 400 and flushing the TLB 130. Then, the segmented memory protection mechanism may be completely deactivated again, by switching from the truncated shadow GDT 908T to the untruncated shadow GDT 908U. The two shadows embodiment may then continue as described above, completely activating the segmented memory protection mechanism during binary translation and completely deactivating the mechanism during direct execution, until the memory paging protection mechanism is deactivated again because binary translated code is again executed at a CPL of 3. Other modifications may be made to the lazy detruncation embodiment, the lazy truncation embodiment and the lazy detruncation and lazy truncation embodiment, so that, whenever the memory paging protection mechanism is inactive, and the VMM 400 is in the direct execution mode, the segmented memory protection mechanism is completely active to protect the VMM memory 930. In these other three embodiments, once the memory paging protection mechanism is activated again, the segmented memory protection mechanism may be partially or completely deactivated to improve efficiency.

Figure 12:
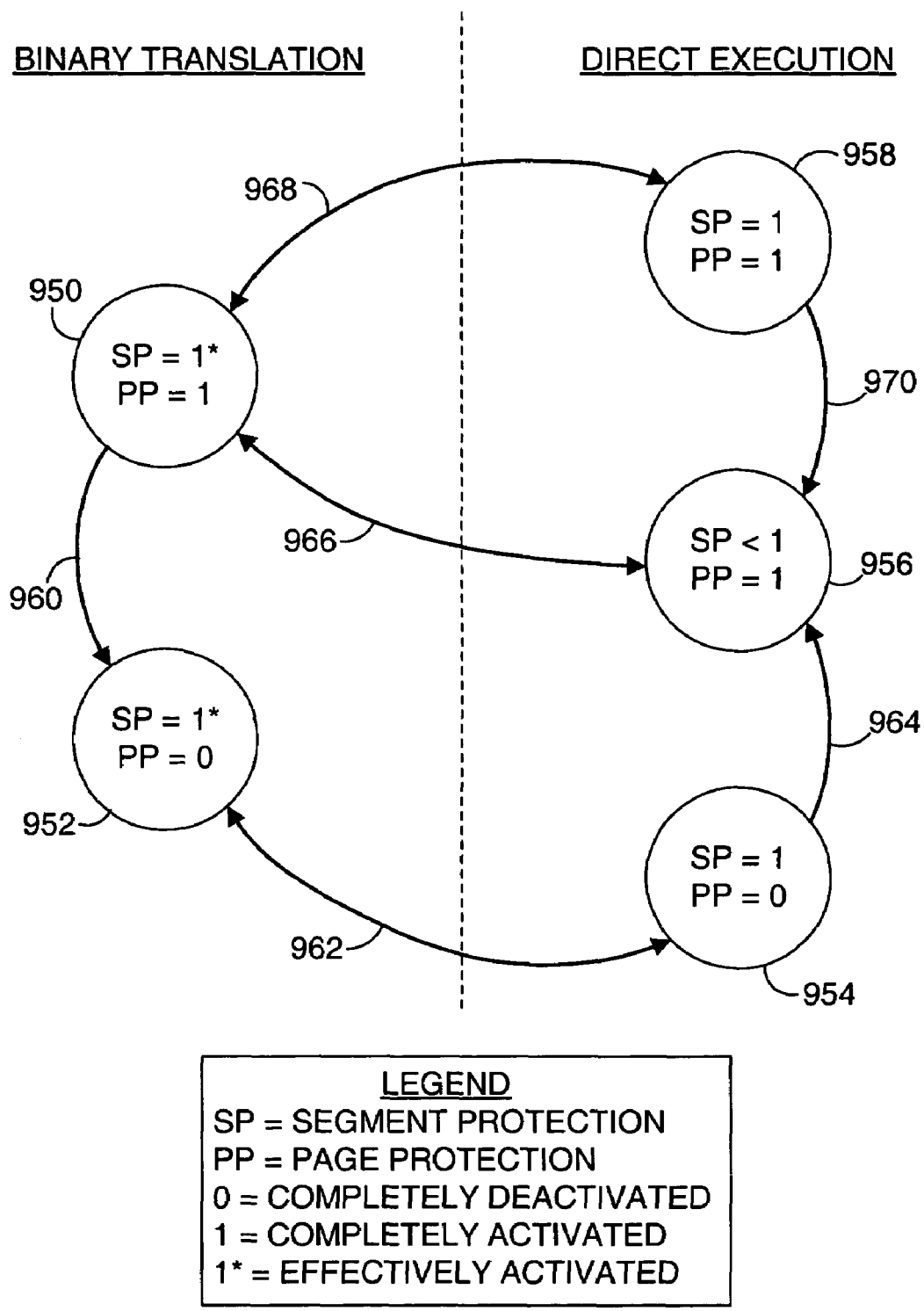
FIG. 12 is a state diagram illustrating a method under the invention for activating and partially or completely deactivating a segmented memory protection mechanism and for activating and deactivating a memory paging protection mechanism during the operation of a VMM.

FIG. 12 is a state diagram that illustrates a method that may be used in the more recent VMware products to activate and deactivate the two protection mechanisms to maintain protection for the VMM memory 930. The state diagram includes a first state 950 and a second state 952 that may be active during the binary translation mode, along with a third state 954, a fourth state 956 and a fifth state 958 that may be active during the direct execution mode. In FIG. 12, "SP" indicates the segmented memory protection mechanism and "PP" indicates the memory paging protection mechanism. A "0" indicates that a protection mechanism is completely inactive or deactivated; a "1" indicates that a protection mechanism is completely active; and a "1*" indicates that a protection mechanism may not be completely active, but it is at least "effectively active," as that term is defined above. Thus, a protection mechanism that is completely active is also effectively active, but a protection mechanism that is effectively active may not be completely active. Using "<1" indicates that a protection mechanism is not completely active, so that it is either partially or completely deactivated. Note that the segmented memory mechanism is at least effectively active at all times during binary translation because the memory paging mechanism has no effect during binary translation, whether it is active or not. Also, the memory paging mechanism is always either completely active or completely inactive.

At the state 950, the segmented memory mechanism is at least effectively active (SP=1*). Thus, it may be completely active, with every guest memory segment truncated, as needed to protect the VMM memory 930; or some guest memory segments may be untruncated even though they extend into the memory space occupied by the VMM memory 930, so long as all memory segments are truncated, as needed, before they are activated. Also at the state 950, the memory paging mechanism is completely active (PP=1).

Now, if the VMM 400 switches to direct execution from the state 950, then the method of FIG. 12 proceeds either to the state 958 using a path 968 or to the state 956 using a path 966. At the state 958, the segmented memory mechanism is completely active (SP=1) and the memory paging mechanism is also completely active (PP=1). This state 958 is typically only reached if the segmented memory mechanism is completely active at the state 950 when a transition is made to direct execution.

From the state 958, once the VMM 400 has begun directly executing guest instructions, the method of FIG. 12 may proceed to the state 956, using a path 970. At the state 956, the memory paging mechanism is still completely active (PP=1), while the segmented memory mechanism is partially or completely inactive (SP<1). Thus, when the method of FIG. 12 is at the state 958, a partial or complete deactivation of the segmented memory mechanism causes a transition to the state 956 using the path 970. The segmented memory mechanism may be partially or completely deactivated because the memory paging mechanism is completely activated. If, when the method of FIG. 12 is at the state 958, the segmented memory mechanism is not deactivated at all during a pass through direct execution, before the VMM 400 switches back to binary translation, the method of FIG. 12 returns from the state 958 to the state 950, using the path 968.

As an example of these transitions, consider the lazy detruncation embodiment described above. In that embodiment, the segmented memory mechanism is completely active during binary translation, and it remains completely active during a transition to direct execution, yielding a transition from the state 950 to the state 958 using the path 968. The same transition can occur in the lazy detruncation and lazy truncation embodiment, if the segmented memory mechanism happens to be completely active when the VMM switches from binary translation to direct execution. Now in either of these embodiments, if one or more memory segments are detruncated in response to a general protection fault, then the segmented memory mechanism is partially deactivated, yielding a transition from the state 958 to the state 956 using the path 970. On the other hand, if the VMM 400 switches back to binary translation before any memory segments are lazily detruncated, then the method of FIG. 12 makes a transition back from the state 958 to the state 950, using the path 968.

From the state 950, as mentioned above, the method of FIG. 12 may alternatively proceed to the state 956 using the path 966. This transition may occur under at least two situations. First, if the segmented memory mechanism is partially activated and partially deactivated (although it is effectively active) when the VMM 400 switches to direct execution, there is no need to completely activate the segmented memory mechanism because the memory paging mechanism is already completely active, and so the transition may be made to direct execution with the segmented memory mechanism partially, but not completely, activated. This situation can arise in the lazy detruncation and lazy truncation embodiment. In this embodiment, if there are one or more memory segments that have been truncated, along with one or more segments that have not been truncated, when the VMM switches to direct execution, the transition is made from the state 950 to the state 956 using the path 966, without truncating the untruncated memory segments and without detruncating the truncated memory segments, leaving the segmented memory mechanism partially activated and partially deactivated.

A second situation under which a transition may be made from the state 950 to the state 956 involves the complete deactivation of the segmented memory mechanism when switching from binary translation to direct execution. Again, the segmented memory mechanism may be deactivated because the memory paging mechanism is completely active. As an example, in the two shadows embodiment, the method of FIG. 12 is in the state 950 during binary translation, with the segmented memory mechanism completely active using the truncated shadow GDT 908T (see FIG. 9A). When the VMM 400 switches to direct execution, the segmented memory mechanism is completely deactivated when the VMM activates the untruncated shadow GDT 908U (see FIG. 9B), causing a transition from the state 950 to the state 956 over the path 966. Also, in the lazy truncation embodiment, the segmented memory mechanism is completely deactivated during a transition from binary translation to direct execution by detruncating any memory segments that were lazily truncated during binary translation, causing the same transition from the state 950 to the state 956.

From the state 956, when the VMM 400 switches from direct execution to binary translation, the method of FIG. 12 may return to the state 950 over the path 966. In this situation, the segmented memory mechanism must be made at least effectively active, if it is not already, because the memory paging mechanism has no effect in binary translation, even when it is completely active. The segmented memory mechanism may be made effectively active, but not necessarily completely active, during a transition from the state 956 to the state 950 over the path 966 in either the lazy truncation embodiment or the lazy detruncation and lazy truncation embodiment. In either of these embodiments, if one or more memory segments are untruncated when the VMM switches from direct execution to binary translation, only those memory segments that are untruncated and active, if any, are truncated during the transition to binary translation. In the two shadows embodiment and the lazy detruncation embodiment, all memory segments that are untruncated when the VMM 400 switches from direct execution to binary translation become truncated, as needed, during the transition, either by truncating all memory segments that are untruncated in the lazy detruncation embodiment or by switching from the untruncated shadow GDT 908U to the truncated shadow GDT 908T in the two shadows embodiment.

The portions of the state diagram of FIG. 12 that have been described thus far cover the states and the transitions between states that are involved in the earlier VMware products described above in which binary translated code is always executed at a CPL of 1. These portions of the state diagram of FIG. 12 also apply to the more recent VMware products described above in which binary translated code is executed at a CPL of 3 when the corresponding guest software executes at a CPL of 3. The entire state diagram of FIG. 12 actually covers the states and the transitions between states that are involved in the more recent VMware products.

Thus, suppose that, in the more recent products, the VMM 400 is in the binary translation mode, executing at a CPL of 1. Suppose further that the method of FIG. 12 is at the state 950, so that the segmented memory mechanism is at least effectively active and the memory paging mechanism is completely active. Now suppose the guest software that is executing in the VM 300 causes the virtual CPU 302 to switch to a CPL of 3. As described above, the memory paging mechanism is completely deactivated and the physical CPU 102 is also caused to switch to a CPL of 3. In FIG. 12, this situation is represented by a transition from the state 950 to the state 952 over a path 960. Thus, at the state 952, the memory paging mechanism is completely inactive (PP=0) and the segmented memory mechanism remains effectively active (SP=1*). This situation occurs in any of the four embodiments described above, namely the two shadows embodiment, the lazy detruncation embodiment, the lazy truncation embodiment and the lazy detruncation and lazy truncation embodiment, whenever the execution of binary translated code is switched from a CPL of 1 to a CPL of 3. In some situations, the segmented memory mechanism is completely active, while, in other situations, the segmented memory mechanism is effectively active, but not completely active. More specifically, in the two shadows embodiment and the lazy detruncation embodiment, the segmented memory mechanism is always completely active during binary translation, while for the lazy truncation embodiment and the lazy detruncation and lazy truncation embodiment, the segmented memory mechanism may be partially inactive.

The method of FIG. 12 remains in the state 952 until the VMM 400 switches from binary translation to direct execution. During this time that the method of FIG. 12 remains in the state 952, the BT unit 462 may return to executing translated code at a CPL of 1, but, at least in one embodiment, the memory paging mechanism remains inactive and the method remains in the state 952.

When the VMM does switch to direct execution, the method of FIG. 12 makes a transition from the state 952 to the state 954 over a path 962. During this transition, the memory paging mechanism remains completely inactive (PP=0) and the segmented memory mechanism is made completely active (SP=1), if it is not already completely active. During direct execution, when the memory paging mechanism is inactive, the segmented memory mechanism must be completely active. Otherwise, the guest software could load an untruncated shadow segment descriptor into a segment register, where the corresponding memory segment extends into the linear address space 916V that is occupied by the VMM memory 930. Then, the VMM memory would be vulnerable to guest accesses that are within the guest memory segment. Such a memory access would not be blocked by either of the protection mechanisms.

Thus, for this transition from the state 952 to the state 954, the lazy detruncation embodiment and the lazy detruncation and lazy truncation embodiment are modified so that any memory segments that were not truncated during binary translation are truncated now, before switching to direct execution. The two shadows embodiment and the lazy truncation embodiment also operate differently in the more recent products. Instead of completely deactivating the segment protection mechanism during a transition from binary translation to direct execution, these embodiments leave the segment protection mechanism completely active.

From the state 954, the method of FIG. 12 may return to the state 952 over the path 962 if the VMM 400 switches back to binary translation. In this event, the memory paging mechanism remains completely inactive and the segmented memory mechanism remains completely active, regardless of which of the four embodiments described above are implemented. The BT unit 464 may execute translated code at a CPL of 1, at a CPL of 3 or at both CPLs. From the state 952, the method of FIG. 12 returns again to the state 954 when the VMM switches back to direct execution. The method of FIG. 12 may switch back and forth between the states 952 and 954 multiple times.

At some point, when the VMM 400 is in the direct execution mode, and the method of FIG. 12 is at the state 954, the VMM may decide to partially or completely deactivate the segmented memory mechanism to improve the efficiency of the virtual computer system, such as in response to a general protection fault, which may have been caused by a truncated guest memory segment unnecessarily blocking a guest access. If the segmented memory mechanism is partially or completely deactivated, however, the memory paging mechanism must be completely activated again before the direct execution of guest instructions can resume. Thus, the memory paging mechanism is completely activated again as described above. At this point, the method of FIG. 12 transitions from the state 954 to the state 956 over a path 964. For the two shadows embodiment and the lazy truncation embodiment, the segmented memory mechanism is completely deactivated at this point, while, for the lazy detruncation embodiment and the lazy detruncation and lazy truncation embodiment, the segmented memory mechanism may only be partially deactivated. From the state 956, the method of FIG. 12 transitions to the state 950 when the VMM switches back to binary translation, as described above.

To partially summarize the use of paths in FIG. 12, the path 960 is used to transition from the state 950 to the state 952 whenever binary translated code is executed at a CPL of 3 while the memory paging mechanism is active. Use of the path 970 to transition from the state 958 to the state 956 and use of the path 964 to transition from the state 954 to the state 956 are optional. Each of these paths may be taken to partially or completely deactivate the segmented memory mechanism in an attempt to improve the efficiency of the virtual computer system by reducing or eliminating the number of unnecessary general protection faults caused by truncated memory segments blocking guest accesses that pose no risk to the VMM memory.

Other transitions between the states illustrated in FIG. 12 are also possible. For example, suppose the VMM 400 is in the binary translation mode and the memory paging mechanism has been deactivated because translated code has been executed at a CPL of 3, so that the method of FIG. 12 is at the state 952. In this situation, the VMM could activate the memory paging mechanism again, instead of ensuring that the segmented memory mechanism is completely activated. In this case, the method would transition to the state 956, instead of the state 954.

There are essentially two different virtual computer systems described above, one in which binary translated instructions are only executed at a privileged level and one in which binary translated instructions may be executed at either a privileged level or at a user level. There are also four different embodiments of the invention described above, namely a two shadows embodiment, a lazy detruncation embodiment, a lazy truncation embodiment, and a lazy detruncation and lazy truncation embodiment. Each of these four embodiments may be implemented in either of the described virtual computer systems, with minor modifications as described above. Each of these four embodiments may also be implemented in other virtual computer systems, possibly with other modifications. Also, other embodiments of the invention, in addition to the four described above, may be implemented in either of the virtual computer systems described above or in other virtual computer systems. Finally, any of the four embodiments of the invention described above, as well as other embodiments of the invention, may be implemented in other, non-virtualized computer systems.

What is claimed is:

1. A method performed in a computer system for enabling a first software entity to use an address space of a second software entity while preventing the second software entity from accessing memory of the first software entity, the computer system implementing segmented memory and memory paging, the computer system having a first operating mode in which instructions are sometimes executed at a more-privileged level and sometimes at a less-privileged level and in which a first set of one or more instructions accesses the memory of the first software entity and a second set of one or more instructions is to be prevented from accessing the memory of the first software entity, the computer system also having a second operating mode in which instructions are executed at a less-privileged level and in which a third set of instructions is to be prevented from accessing the memory of the first software entity, the method comprising:

- during the first operating mode, using effectively truncated memory segments for the second set of instructions, the effectively truncated memory segments excluding the memory of the first software entity;
- during the first operating mode, if memory paging protection is active, deactivating memory paging protection before executing instructions at the less-privileged level;
- during the second operating mode, if memory paging protection is inactive, using completely truncated memory segments for the third set of instructions, the completely truncated memory segments excluding the memory of the first software entity;
- at some time when instructions are not being executed at the less-privileged level in the first operating mode, activating memory paging protection so that, during the second operating mode, instructions executed at the less-privileged level cannot access the memory of the first software entity; and
- during the second operating mode, if memory paging protection is active, using one or more untruncated memory segments for the third set of instructions, at least one of the untruncated memory segments including at least a portion of the memory of the first software entity.

2. The method of claim 1, wherein the first software entity is a virtualization software and the second software entity is a guest software.

3. The method of claim 2, wherein the second operating mode involves directly executing the third set of instructions, which is from the guest software.

4. The method of claim 3, wherein the first operating mode involves executing translated instructions that are translated from guest instructions from the guest software and wherein the second set of instructions involves guest accesses.

5. The method of claim 1, further comprising:

- when transitioning from the second operating mode to the first operating mode, activating a first set of memory segments that includes the completely truncated memory segments, if the first set of memory segments is not already active;
- when transitioning from the first operating mode to the second operating mode, if memory paging protection is active, activating a second set of memory segments that includes the untruncated memory segments, wherein the second set of memory segments is distinct from the first set of memory segments; and
- during the second operating mode, if memory paging protection is activated, activating the second set of memory segments that includes the untruncated memory segments.

6. The method of claim 5, wherein the memory segments in the first set are defined by entries in a first memory segment table and the memory segments in the second set are defined by entries in a second memory segment table, and wherein the step of activating the first set of memory segments comprises activating the first memory segment table and the step of activating the second set of memory segments comprises activating the second memory segment table.

7. The method of claim 1, wherein, if memory paging protection is active during the second operating mode, one or more truncated memory segments are detruncated in response to a protection fault.

8. The method of claim 1, wherein, during the first operating mode, one or more untruncated memory segments are truncated in response to an attempt by the second software entity to activate the respective memory segments.

9. The method of claim 1, wherein memory paging protection is activated to protect the memory of the first software entity by preventing access to multiple, noncontiguous portions of the address space.

10. The method of claim 1, wherein the memory of the first software entity occupies a highest-address portion of the address space.

11. The method of claim 1, wherein the computer system is based on an x86 processor architecture.

12. A method performed in a computer system for enabling a virtualization software to use an address space of a guest software while preventing the guest software from accessing memory of the virtualization software, the virtualization software supporting a virtual machine on which the guest software runs, the computer system implementing segmented memory and memory paging, the computer system having an emulation mode in which instructions are sometimes executed at a more-privileged level and sometimes at a less-privileged level and in which a first set of one or more instructions accesses the memory of the virtualization software and a second set of one or more instructions is to be prevented from accessing the memory of the virtualization software, the computer system also having a second operating mode in which a set of guest instructions is directly executed on the computer system at a less-privileged level, wherein the set of guest instructions is to be prevented from accessing the memory of the virtualization software, the method comprising:

- during the emulation mode, using effectively truncated memory segments for the second set of instructions, the effectively truncated memory segments excluding the memory of the virtualization software;
- during the emulation mode, if memory paging protection is active, deactivating memory paging protection before executing instructions at the less-privileged level;
- during the second operating mode, if memory paging protection is inactive, using completely truncated memory segments for the guest instructions, the completely truncated memory segments excluding the memory of the virtualization software;
- at some point when instructions are not being executed at the less-privileged level in the emulation mode, activating memory paging protection so that, during the second operating mode, the set of guest instructions executed at the less-privileged level cannot access the memory of the virtualization software; and
- during the second operating mode, if memory paging protection is active, using one or more untruncated memory segments for the guest instructions, at least one of the untruncated memory segments including at least a portion of the memory of the virtualization software.

13. The method of claim 12, wherein the emulation mode involves executing translated instructions that are translated from guest instructions from the guest software and wherein the second set of instructions involves guest accesses.

14. The method of claim 12, further comprising:
when transitioning from the second operating mode to the emulation mode, activating a first set of memory segments that includes the completely truncated memory segments, if the first set of memory segments is not already active; and
when transitioning from the emulation mode to the second operating mode, if memory paging protection is active, activating a second set of memory segments that includes the untruncated memory segments, wherein the second set of memory segments is distinct from the first set of memory segments; and
during the second operating mode, if memory paging protection is activated, activating the second set of memory segments that includes the untruncated memory segments.

15. The method of claim 12, wherein, if memory paging protection is active during the second operating mode, one or more truncated memory segments are detruncated in response to a protection fault.

16. The method of claim 12, wherein, during the emulation mode, one or more untruncated memory segments are truncated in response to an attempt by the guest software to activate the respective memory segments.

17. The method of claim 12, wherein memory paging protection is activated to protect the memory of the virtualization software by preventing access to multiple, noncontiguous portions of the address space.

18. A method performed in a computer system for enabling a first software entity to use an address space of a second software entity while preventing the second software entity from accessing memory of the first software entity, the computer system implementing segmented memory and memory paging, the computer system having a first operating mode in which instructions are sometimes executed at a more-privileged level and sometimes at a less-privileged level and in which a first set of one or more instructions accesses the memory of the first software entity and a second set of one or more instructions is to be prevented from accessing the memory of the first software entity, the computer system also having a second operating mode in which instructions are executed at a less-privileged level and in which a third set of instructions is to be prevented from accessing the memory of the first software entity, the method comprising:
during the first operating mode, using truncated memory segments to ensure that the second set of instructions can only use memory segments that exclude the memory of the first software entity, while allowing the first set of instructions to use one or more memory segments that include at least a portion of the memory of the first software entity;
during the first operating mode, if memory paging protection is active, deactivating memory paging protection before executing instructions at the less-privileged level;
during the second operating mode, if memory paging protection is inactive, using truncated memory segments to ensure that the third set of instructions can only use memory segments that exclude the memory of the first software entity;
at some time when instructions are not being executed at the less-privileged level in the first operating mode, activating memory paging protection so that, during the second operating mode, instructions executed at the less-privileged level cannot access the memory of the first software entity; and
during the second operating mode, if memory paging protection is active, allowing the third set of instructions to use one or more memory segments that include at least a portion of the memory of the first software entity.

19. The method of claim 18, wherein the first software entity is a virtualization software and the second software entity is a guest software.

20. The method of claim 19, wherein the second operating mode involves directly executing the third set of instructions, which is from the guest software.

21. The method of claim 20, wherein the first operating mode involves executing translated instructions that are translated from guest instructions from the guest software and wherein the second set of instructions involves guest accesses.

22. The method of claim 18, further comprising:
when transitioning from the second operating mode to the first operating mode, activating a first set of memory segments that includes the truncated memory segments that exclude the memory of the first software entity, if the first set of memory segments is not already active;
when transitioning from the first operating mode to the second operating mode, if memory paging protection is active, activating a second set of memory segments that includes the untruncated memory segments that include at least a portion of the memory of the first software entity, wherein the second set of memory segments is distinct from the first set of memory segments; and
during the second operating mode, if memory paging protection is activated, activating the second set of memory segments that includes the untruncated memory segments.

23. The method of claim 18, wherein, if memory paging is active during the second operating mode, one or more truncated memory segments are detruncated in response to a protection fault.

24. The method of claim 18, wherein, during the first operating mode, one or more untruncated memory segments are truncated in response to an attempt by the second software entity to activate the respective memory segments.

25. The method of claim 18, wherein memory paging protection is activated to protect the memory of the first software entity by preventing access to multiple, noncontiguous portions of the address space.

26. A method performed in a computer system for enabling a virtualization software to use an address space of a guest software while preventing the guest software from accessing memory of the virtualization software, the virtualization software supporting a virtual machine on which the guest software runs, the computer system implementing segmented memory and memory paging and the virtual machine also implementing segmented memory, the guest software creating a guest memory segment within the virtual machine that includes at least a portion of the memory of the virtualization software, the computer system having an emulation mode in which instructions are sometimes executed at a more-privileged level and sometimes at a less-privileged level and in which a first set of one or more instructions accesses the memory of the virtualization software and a second set of one or more instructions is to be prevented from accessing the memory of the virtualization software, the computer system also having a second operating mode in which a set of guest instructions is directly executed on the computer system at a less-privileged level, wherein the set of guest instructions is to be prevented from accessing the memory of the virtualization software, the method comprising:

during the emulation mode, using a truncated shadow memory segment for the second set of instructions, the truncated shadow memory segment corresponding to the guest memory segment, but being truncated to exclude the memory of the virtualization software;

during the emulation mode, if memory paging protection is active, deactivating memory paging protection before executing instructions as the less-privileged level;

during the second operating mode, if memory paging protection is inactive, using the truncated shadow memory segment for the set of guest instructions;

at some time when instructions are not being executed at the less-privileged level in the emulation mode, activating memory paging protection so that, during the second operating mode, the set of guest instructions executed at the less-privileged level cannot access the memory of the virtualization software; and during the second operating mode, if memory paging protection is active, using an untruncated shadow memory segment for the guest instructions, the untruncated shadow memory segment corresponding to the guest memory segment, and including at least a portion of the memory of the virtualization software.

27. The method of claim 26, wherein the emulation mode involves executing translated instructions that are translated from guest instructions from the guest software and wherein the second set of instructions involves guest accesses.

28. The method of claim 26, further comprising:

when transitioning from the second operating mode to the emulation mode, activating a first set of memory segments that includes the truncated shadow memory segment, if the first set of memory segments is not already active;

when transitioning from the emulation mode to the second operating mode, if memory paging protection is active, activating a second set of memory segments that includes the untruncated shadow memory segment, wherein the second set of memory segments is distinct from the first set of memory segments; and during the second operating mode, if memory paging protection is activated, activating the second set of memory segments that includes the untruncated shadow memory segment.

29. The method of claim 26, wherein, if memory paging protection is active during the second operating mode, the truncated shadow memory segment is detruncated in response to a protection fault to create the untruncated shadow memory segment.

30. The method of claim 26, wherein, during the emulation mode, the untruncated shadow memory segment is truncated to create the truncated shadow memory segment, in response to an attempt by the guest software to activate the guest memory segment.

31. The method of claim 26, wherein memory paging protection is activated to protect the memory of the virtualization software by preventing access to multiple, noncontiguous portions of the address space.

* * * * *